(12) United States Patent
Mishali et al.

(10) Patent No.: US 8,457,579 B2
(45) Date of Patent: Jun. 4, 2013

(54) EFFICIENT SAMPLING AND RECONSTRUCTION OF SPARSE MULTI-BAND SIGNALS

(75) Inventors: Moshe Mishali, Haifa (IL); Yonina Eldar, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 0 days.

(21) Appl. No.: 13/144,086

(22) PCT Filed: Feb. 15, 2010

(86) PCT No.: PCT/IB2010/050661
§ 371 (c)(1),
(2), (4) Date: Jul. 12, 2011

(87) PCT Pub. No.: WO2010/095083
PCT Pub. Date: Aug. 26, 2010

(65) Prior Publication Data
US 2011/0294453 A1     Dec. 1, 2011

Related U.S. Application Data

(60) Provisional application No. 61/153,438, filed on Feb. 18, 2009, provisional application No. 61/247,030, filed on Sep. 30, 2009, provisional application No. 61/265,365, filed on Dec. 1, 2009.

(51) Int. Cl.
*H04B 1/16* (2006.01)

(52) U.S. Cl.
USPC ........... 455/207; 455/130; 455/131; 455/166; 455/168.1

(58) Field of Classification Search
USPC .................. 455/130, 131, 166, 168.1, 188.1, 455/207, 209, 213, 315, 323, 326
See application file for complete search history.

(56) References Cited

U.S. PATENT DOCUMENTS

| 5,414,623 A | 5/1995 | Lu et al. |
| 5,812,605 A * | 9/1998 | Smith et al. ................ 375/308 |
| 6,018,600 A | 1/2000 | Levin et al. |
| 6,806,708 B1 * | 10/2004 | Lee et al. ..................... 324/307 |

(Continued)

FOREIGN PATENT DOCUMENTS

WO    2010/095083 A1    8/2010

OTHER PUBLICATIONS

Kotelnikov, V.A., "On the transmission capacity of 'ether' and wire in electrocommunications", Proceedings of the first All-Union Conference on the technological reconstruction of the communications sector and the development of low-current engineering, Moscow, Russia, 1933.

(Continued)

*Primary Examiner* — Tuan Pham
(74) *Attorney, Agent, or Firm* — D. Kligler I.P. Services Ltd.

(57) ABSTRACT

A method for signal processing includes distributing an analog input signal to a plurality of processing channels. In each processing channel, the input signal is mixed with a respective periodic waveform including multiple spectral lines, so as to produce a respective baseband signal in which multiple spectral slices of the input signal are superimposed on one another. The baseband signal produced in each of the processing channels is digitized, to produce a set of digital sample sequences that represent the input signal.

59 Claims, 7 Drawing Sheets

U.S. PATENT DOCUMENTS

| | | | |
|---|---|---|---|
| 7,652,608 B1* | 1/2010 | Mathis et al. | 341/155 |
| 8,032,085 B2 | 10/2011 | Mishali et al. | |
| 2002/0003843 A1 | 1/2002 | Maritone | |
| 2004/0264634 A1 | 12/2004 | Claus et al. | |
| 2005/0141603 A1 | 6/2005 | Miller | |
| 2005/0179585 A1 | 8/2005 | Walker et al. | |
| 2006/0009225 A1 | 1/2006 | Herre et al. | |
| 2006/0013597 A1 | 1/2006 | Crivelli et al. | |
| 2006/0217082 A1 | 9/2006 | Fischer | |
| 2008/0129560 A1 | 6/2008 | Baraniuk et al. | |
| 2008/0221711 A1 | 9/2008 | Trainer | |
| 2009/0190689 A1 | 7/2009 | Blu et al. | |
| 2010/0178057 A1* | 7/2010 | Shieh | 398/79 |
| 2011/0225218 A1 | 9/2011 | Eldar et al. | |
| 2012/0068867 A1* | 3/2012 | Pagnanelli | 341/120 |

OTHER PUBLICATIONS

Black et al., "Time interleaved converter arrays", IEEE International Conference on Solid-State Circuits, vol. XXIII, pp. 14-15 & 254, Feb. 13, 1980.

Eldar et al., "Filter bank reconstruction of bandlimited signals from nonuniform and generalized samples," IEEE Transactions on Signal Processing, vol. 48, No. 10, pp. 2864-2875, Oct. 2000.

Eldar et al., "A minimum squared-error framework for generalized sampling", IEEE Transactions on Signal Processing, vol. 54, No. 6, pp. 2155-2167, Jun. 2006.

Jeng, Y.C., "Digital spectra of nonuniformly sampled signals: a robust sampling time offset estimation algorithm for ultra high-speed waveform digitizers using interleaving", IEEE Transactions on Instrumentation & Measurement, vol. 39, No. 1, pp. 71-75, Feb. 1990.

Lin et al., "Periodically nonuniform sampling of bandpass signals", IEEE Transactions on Circuits & Systems—II: Analog & Digital Signal Processing, vol. 45, No. 3, pp. 340-351, Mar. 1998.

Tian et al., "Compressed sensing for wideband cognitive radios", IEEE Conference on Acoustics, Speech & Signal Processing, vol. 4, pp. IV1357-IV1360, Honolulu, USA, Apr. 15-20, 2007.

Davis et al., "Adaptive Greedy Approximations", Journal on Constructive Approximation, vol. 13, No. 1, pp. 57-98, year 1997.

Candes et al., "Decoding by Linear Programming", IEEE Transactions on Information Theory, vol. 51, No. 12, pp. 4203-4215, Dec. 2005.

Kruskal, J.B., "Three-way Arrays: rank and uniqueness of trilinear decompositions, with application to arithmetic complexity and statistics", Linear Algebra and its Applications, vol. 18, issue 2, pp. 95-138, year 1977.

Mondillo et al., "Handheld echocardiography: its use and usefulness", International Journal of cardiology, vol. 111, No. 1, pp. 1-5, year 2006.

Tropp et al., "Random Filters for Compressive Sampling and Reconstruction", IEEE International Conference on Acoustics, Speech and Signal Processing, pp. III872-III875, Toulouse, France, May 2006.

Unser et al., "A General Sampling Theory for Nonideal Acquisition Devices", IEEE Transactions on Signal Processing, vol. 42, No. 11, pp. 2915-2925, Nov. 1994.

Aldroubi et al., "Nonuniform Sampling and Reconstruction in Shift-Invariant Spaces", SIAM Journal, vol. 43, issue 4, pp. 585-620, Mar. 2001.

Eldar et al., "Nonideal Sampling and Interpolation From Noisy Observations in Shift-Invariant Spaces", IEEE Transactions on Signal Processing, vol. 54, No. 7, pp. 2636-2651, Jul. 2006.

Hou et al., "A new method for high resolution estimation of time delay", IEEE International Conference on Acoustics, Speech and Signal Processing, vol. 7, pp. 420-423, May 1982.

Senior et al., "Portable echocardiography: a review", British Journal of cardiology, vol. 13, No. 3, pp. 185-189, May/Jun. 2006.

Bienvenu et al., "Adaptivity to background noise spatial coherence for high resolution passive methods", IEEE International Conferences on Acoustics, Speech and Signal Processing, vol. 05, pp. 307-310, Apr. 1980.

Unser, M., "Splines: A Perfect Fit for Signal and Image Processing", IEEE Signal Processing Magazine, vol. 16, No. 6, pp. 22-38, Nov. 1999.

Unser et al., "Cardinal Exponential Splines: Part I—Theory and Filtering Algorithms", IEEE Transactions on Signal Processing, vol. 53, No. 4, pp. 1425-1438, Apr. 2005.

Maravic et al., "Sampling and reconstructions of signals with finite rate of innovation in the presence of noise", IEEE Transactions on Signal Processing, vol. 53, No. 8, pp. 2788-2805, Aug. 2005.

Kusuma et al., "Multichannel Sampling of Parametric Signals with a Successive Approximation Property", IEEE International Conference in Image Processing, pp. 1265-1268, Oct. 2006.

Shan et al., "On Spatial Smoothing for direction-of-arrival estimation of coherent signals", IEEE Transactions on Acoustics, Speech and Signal Processing, vol. 33, No. 4, pp. 806-811, Aug. 1985.

Bresler et al., "Spectrum-blind minimum rate sampling and reconstruction of 2-D multi-band signals", IEEE International Conference on Image Processing, vol. 1, pp. 701-704, Switzerland, Sep. 1996.

Benedetto et al., "Gabor Systems and the balian-low theorem", Gabor Analysis and Algorithms: Theory and Applications, pp. 85-122, year 1998.

Feichtinger et al., "A Banach space of test functions for gabor analysis", Gabor Analysis and Algorithms: Theory and Applications, p. 123-170, year 1998.

Daubechies et al., "Painless nonorthogonal expansions", Journal of Mathematical Physics, vol. 27, No. 5, pp. 1271-1283, May 1986.

Christensen et al., "Pairs of dual gabor frame generators with compact support and desired frequency localization", Applied and Computational Harmonic Analysis, vol. 20, No. 3, pp. 403-410, May 2006.

Candes et al., "Near Optimal Signal Recovery from random projections: universal encoding strategies?", IEEE information Theory, vol. 52, No. 12, pp. 5406-5425, Dec. 2006.

Rudelson et al., "On Sparse Reconstruction from Fourier and Gaussian Measurements", Communications on Pure and Applied Mathematics, vol. 61, issue 8, pp. 1025-1045, year 2008.

Ron et al., "Frames and stable bases for shift-invariant subspaces of $L_2(R^d)$", Canadian Journal of Mathematics, vol. 47, No. 5, pp. 1051-1094, year 1995.

Prete, V.D., "Estimates, decay properties, and computation of the dual function for gabor frames", Journal of Fourier Analysis and Applications, vol. 5, issue 6, pp. 545-562, year 1999.

Grochenig et al., "Note on b-slines, wavelet scaling functions, and gabor games", IEEE Transactions on Information Theory, vol. 49, No. 12, pp. 3318-3320, Dec. 2003.

Folland et al., "The uncertainty principle: a mathematical survey", Journal of Fourier Analysis and Applications, vol. 3, No. 3, pp. 207-238, year 1997.

Butzer et al., "A sampling theorem for duration-limited functions with error estimates", Information and Control, vol. 34, issue 1, pp. 55-65, May 1977.

Butzer et al., "Sampling theory for not necessarily band-limited functions: A historical overview", SIAM review, vol. 34, No. 1, pp. 40-53, Mar. 1992.

Grochenig, K., "Foundations of Time-Frequency Analysis", chapter 3.1 (pp. 36-41) and chapter 5.2 (pp. 92-97, year 2001.

Dragotti et al., "Sampling moments and reconstructing signals of finite rate of innovation: Shannon meets strang-fix", IEEE Transactions on Signal Processing, vol. 55, No. 5, pp. 1741-1757, May 2007.

Hua et al., "Matrix pencil method for estimating parameters of exponentially damped/undamped sinusoids in noise", IEEE Transactions on Acoustics, Speech and Signal Processing, vol. 38, No. 5, pp. 814-824, May 1990.

Kumaresan et al., "Estimating the angles of arrival of multiple plane waves", IEEE Transactions on Aerospace Electronic System, vol. AES19, No. 1, pp. 134-139, Jan. 1983.

Roy et al., "ESPRIT-estimation of signal parameters via rotational invariance techniques", IEEE Transactions on Acoustics, Speech and Signal Processing, vol. 37, No. 7, pp. 984-995, Jul. 1989.

Schmidt, E., "Multiple emitter location and signal parameter estimation", IEEE Transactions on Antennas & Propagation, vol. AP-34, No. 3, pp. 276-280, Mar. 1986.

International Application PCT/IB2010/050661 Search Report dated Jul. 15, 2010.
PCT Application PCT/IB2011/054384 filed Oct. 5, 2011.
PCT Application PCT/IB2011/051449 filed Apr. 5, 2011.
EP Application # 11156901.8 Extended Search Report dated Jul. 6, 2011.
Mishali et al., "Spectrum-blind reconstruction of multi-band signals", IEEE International Conference on Acoustics, Speech and Signal Processing, pp. 3365-3368, Las Vegas, USA, Mar. 31-Apr. 4, 2008.
"Cascaded 2-Tone, 3rd-Order Compression Point (IP3)", RF Cafe Website, downloaded from http://www.rfcafe.com/references/electrical/ip3.htm on Apr. 19, 2010.
European Application # 08808014.8 Examination Report dated Apr. 19, 2010, 17 pages.
Venkataramani et al., "Further results on spectrum blind sampling of 2D signals", Proceedings of the 1998 International Conference on Image Processing (ICIP), vol. 2, pp. 752-756, Oct. 4, 1998.
Chen et al., "Theoretical results on sparse representations of multiple-measurement vectors", IEEE Transactions on Signal Processing, vol. 54, No. 12, pp. 4634-4643, Dec. 2006.
International Application PCT/IB2011/051449 Search Report dated Nov. 14, 2011.
International Application PCT/IB2011/054384 Search Report dated Feb. 17, 2012.
Candes et al., "Compressed Sensing with Coherent and Redundant Dictionaries", May 14, 2010.
Mishali et al., "From Theory to Practice: Sub-Nyquist Sampling of Sparse Wideband Analog Signals", IEEE Journal of Selected Topics in Signal Processing, vol. 4, No. 2, pp. 375-391, Apr. 2010.
Smith et al., "Compressed Sampling for Pulse Doppler Radar", IEEE Radar Conference, pp. 887-892, May 10, 2010.
Pfander et al., "Sparsity in Time Frequency Representations", Journal of Fourier Analysis and Applications, vol. 16, No. 2, pp. 233-260, Aug. 4, 2009.
Matusiak et al., "Sub-Nyquist Sampling of Short Pulses: Theory", Apr. 11, 2011.
Chen et al., "A Sub-Nyquist Rate Sampling Receiver Exploiting Compressive Sensing", IEEE Transactions on Circuits and Systems-I: Regular papers, vol. 58, No. 3, pp. 507-520, Mar. 2011.
Mishali et al., "Reduce and Boost: Recovering Arbitrary Sets of Jointly Sparse Vectors", IEEE Transactions on Signal Processing, vol. 56, No. 10, pp. 4692-4702, Oct. 2008.
Mishali et al., "Xampling—Part I: Practice", arXiv:0911.0519v1, Nov. 3, 2009.
Mishali et al., "The modulated wideband converter: online documentation and simulations", Jul. 10, 2009 (http://webee.technion.ac.il/Sites/People/YoninaEldar/Info/software/GUI/MWC_GUI.htm).
Calderbank et al., "Compressed Learning: Universal Sparse Dimensionality Reduction and Learning in the Measurement Domain", Feb. 13, 2009.
Candes, E. J., "The Restricted Isometry Property and Its Implications for Compressed Sensing", Feb. 27, 2008.
El-Chammas et al., "General Analysis on the Impact of Phase-Skew in Time-Interleaved ADCs", IEEE Transactions on Circuits and Systems—I: Regular papers, vol. 56, No. 5, pp. 902-910, May 2009.
Chen et al., "Modulated Wideband Converter with Non-Ideal Lowpass Filters", 2010 IEEE International Conference on Acoustics Speech and Signal Processing (ICASSP), pp. 3630-3633, Dallas, USA, Mar. 14-19, 2010.
Rauhut et al., "Average Case Analysis of Multichannel Basis Pursuit", 8th international conference on Sampling Theory and Applications, Marseille, France, May 18-22, 2009.
Eldar et al., "Robust Recovery of Signals From a Structured Union of Subspaces", IEEE Transactions on Information Theory, vol. 55, issue 11, pp. 5302-5316, Nov. 2009.
Fleyer et al., "Multirate Synchronous Sampling of Sparse Multiband Signals", arXiv:0806.0579v1 [cs.IT], Jun. 3, 2008.
Fudge et al., "A Nyquist Folding Analog-to Information Receiver", 42nd Asilomar Conference on Signals, Systems and Computers, pp. 541-545, Pacific Grove, USA, Oct. 26-29, 2008.
Gedalyahu et al., "Low Rate Sampling Schemes for Time Delay Estimation", arXiv:0905.2429v1 [cs.IT], May 14, 2009.

Gentile, K., "Introduction to Zero-Delay Clock Timing Techniques", Analog Device Application Note AN-0983, Rev.0, year 2008.
Li et al., "Quickest Spectrum Sensing in Cognitive Radio", 42nd Annual Conference on Information Sciences and Systems, pp. 203-208, Princeton, USA, Mar. 19-21, 2008.
Lu et al., "A Theory for Sampling Signals from a Union of Subspaces", IEEE Transactions on Signal Processing, vol. 56, issue 6, pp. 2334-2345, Jun. 2008.
Maxim Integrated Products, "Data Converters", year 2008.
Mini-Circuits, "Understanding VCO Concepts", Application Note AN-95-007, Revision , Aug. 21, 2009.
Mishali et al., "Blind Multiband Signal Reconstruction: Compressed Sensing for Analog Signals", IEEE Transactions on Signal Processing, vol. 57, No. 3, pp. 993-1009, Mar. 2009.
Mishali et al., "Expected RIP: Conditioning of The Modulated Wideband Converter", IEEE Information Theory Workshop, pp. 343-347, Taormina, Italy, Oct. 11-16, 2009.
Mishali et al., "From Theory to Practice: Sub-Nyquist Sampling of Sparse Wideband Analog Signals", arXiv:0902.4291v3 [cs.IT], Feb. 25, 2009.
Polo et al., "Compressive Wide-Band Spectrum Sensing", IEEE International Conference on Acoustics, Speech and Signal Processing, pp. 2337-2340, Taipei, Taiwan, Apr. 19-24, 2009.
Polo, Y.L., "Compressive Wideband Spectrum Sensing for Cognitive Radio Applications", Master of Science Thesis, Delft University of Technology, Nov. 28, 2008.
Ragheb et al., "A Prototype Hardware for Random Demodulation Based Compressive Analog-to-Digital Conversion", 51st Midwest Symposium on Circuits and Systems, pp. 37-40, Knoxville, USA, Aug. 10-13, 2008.
Texas Instruments Incorporated, "Data Converters", years 1995-2010.
Tropp et al., "Beyond Nyquist: Efficient Sampling of Sparse Bandlimited Signals", arXiv:0902.0026v2 [cs.IT], Jan. 31, 2009.
Tsai et al., "Correction of Mismatches in a Time-Interleaved Analog-to-Digital Converter in an Adaptively Equalized Digital Communication Receiver", IEEE Transactions on Circuits and Systems—I: Regular Papers, vol. 56, No. 2, pp. 307-319, Feb. 2009.
Wakin, M.B., "A Manifold Lifting Algorithm for Multi-View Compressive Imaging", Picture Coding Symposium, pp. 1-4, Chicago, USA, May 6-8, 2009.
Eldar et al., "Beyond Bandlimited Sampling", IEEE Signal Processing Magazine, vol. 26, issue 3, pp. 48-68, May 2009.
Eldar, Y., "Compressed Sensing of Analog Signals in Shift-Invariant Spaces", IEEE Transactions on Signal Processing, vol. 57, No. 8, pp. 2986-2997, Aug. 2009.
Eldar, Y., "Uncertainty Relations for Shift-Invariant Analog Signals", IEEE Transactions on Signal Processing, vol. 55, No. 12, pp. 5742-5757, Dec. 2009.
Yu et al., "Mixed-Signal Parallel Compressed Sensing and Reception for Cognitive Radio", IEEE International Conference on Acoustics, Speech and Signal Processing, pp. 3861-3864, Las Vegas, USA, Mar. 31-Apr. 4, 2008.
Zhang et al., "Compressive Sensing Based Ultra-wideband Communication System", IEEE International Conference on Communications, pp. 1-5, Dresden, Germany, Jun. 14-18, 2009.
Camarero et al., "Mixed Signal Clock-Skew Calibrator for Time Interleaved Analog-to-Digital Converters", IEEE Transactions on Circuits and Systems—I: Regular papers, vol. 55, No. 11, pp. 3676-3687, Dec. 2008.
Mendelson et al., "Uniform Uncertainty Principle for Bernouilli and Subgaussian Ensembles", arXiv: math/0608665v1, Aug. 27, 2006.
Laugesen, R.S., "Gabor Dual Spline Windows", Jun. 23, 2008.
Christensen et al., "Gabor windows supported on [-1,1] and compactly supported dual windows", BK21 Research Report, Jun. 24, 2009.
Prete, V., "On a Necessary Condition for B-Spline Gabor Frames", Ricerche di matematica, vol. 59, No. 1, pp. 161-164, Mar. 12, 2010.
Michaeli et al., "Optimization techniques in modern sampling theory", Convex Optimization in Signal Processing and Communications, Cambridge University Press, Mar. 16, 2009.

Ramani et al., "Nonideal Sampling and Regularization Theory", IEEE Transactions on Signal Processing, vol. 56, No. 3, pp. 1055-1070, Mar. 2008.

Blu et al., "Sparse sampling of signal innovations", IEEE Signal Processing Magazine, vol. 25, No. 2, pp. 31-40, Mar. 2008.

Tur et al., "Low Rate Sampling of Pulse Streams with Application to Ultrasound Imaging", arXiv:1003.2822v3 [cs.IT], Mar. 14, 2010.

Matusiak et al., "Sub-Nyquist Sampling of Short Pulses: Part I", arXiv:1010.3132v1 [cs.IT], Oct. 15, 2010.

Akhoundi Asl et al., "Multichannel Sampling of Signals with Finite Rate of Innovation", IEEE Signal Processing Letters, vol. 17, No. 08, pp. 762-765, Aug. 2010.

Seelamantula et al., "A Generalized Sampling Method for Finite-Rate-of-Innovation-Signal Reconstruction", IEEE Signal Processing Letters, vol. 15, pp. 813-816, year 2008.

Olkkonen et al., "Measurement and Reconstruction of Impulse Train by Parallel Exponential Filters", IEEE Signal Processing Letters, vol. 15, pp. 241-244, year 2008.

Gedalyahu et al., "Time-Delay Estimation From Low-Rate Samples: A Union of Subspaces Approach", IEEE Transactions on Signal Processing, vol. 58, No. 6, pp. 3017-3031, Jun. 2010.

Mishali et al., "Xampling: Signal Acquisition and Processing in Union of Subspaces", arXiv:0911.0519v2 [cs.IT], Sep. 25, 2010.

Mishali et al., "Xampling: analog to digital at sub-Nyquist rates", arXiv:0912.2495v1, Dec. 13, 2009.

Bajwa et al., "Identification of Underspread Linear Systems with Application to Super-Resolution Radar", arXiv:1008.0851v1 [cs.IT], Aug. 4, 2010.

Eldar et al., "Recovering Signals From Lowpass Data", arXiv:0907.3576v1, Jul. 21, 2009.

National Semiconductor Corporation, "A/D Converter—Definition of terms", Jan. 2000.

Tropp, J.A., "Algorithms for simultaneous spare approximation. Part II: Convex relaxation", Special Issue on Sparse Approximations in Signal and Image Processing, vol. 86, issue 3, pp. 589-602, Mar. 2006.

"Wireless LAN Medium Access Control (MAC) and Physical Layer (PHY) specifications: High-speed physical layer in the 5 GHz band," IEEE Standard 802.11a, year 1999.

Zverev, A.I. "Handbook of Filter Synthesis", p. 13, John Wily & Sons 1967.

Viterbi, A.J., "CDMA principles of spread spectrum communication," Addison-Wesly Wireless Communications Series, 1995.

Kohlenberg, A., "Exact interpolation of band-limited functions", Journal of Applied Physics, vol. 24, No. 12, pp. 1432-1435, Dec. 1953.

Dickson et al., "An 80-Gb/s 231—1 pseudorandom binary sequence generator in SiGe BiCMOS technology", IEEE Journal on Solid-State Circuits, vol. 40, No. 12, pp. 2735-2745, Dec. 2005.

Razavi, B., "A 60-GHz CMOS receiver front-end", IEEE Journal of Solid-State Circuits, vol. 41, No. 1, pp. 17-22, Jan. 2006.

Shannon, C.E., "Communication in the presence of noise", Proceeding of IRE, vol. 86, No. 2, pp. 447-457, Feb. 1998 (reprinted from IRE proceedings vol. 37, pp. 10-21, 1949).

Hedge et al., "Random projections for manifold learning", Advances in Neural Information Processing Systems 20, pp. 641-648, year 2008.

Herley et al., "Minimum rate sampling and reconstruction of signals with arbitrary frequency support", IEEE Transactions on Information Theory, vol. 45, No. 5, pp. 1555-1564, Jul. 1999.

Kienmayer et al., "A low-power low-voltage NMOS bulk-mixer with 20 GHz bandwidth in 90 nm CMOS", Proceedings of the 2004 International Symposium on Circuits and Systems, vol. 4, Vancouver, Canada, May 23-26, 2004.

Wang et al., "A background timing-skew calibration technique for time-interleaved analog-to-digital converters", IEEE Transactions on Circuits & Systems—II: Express Briefs, vol. 53, No. 4, pp. 299-303, Apr. 2006.

Donoho et al., "Optimally sparse representation in general (nonorthogonal) dictionaries via l1 minimization", Proceedings of the National Academy of Science of USA, vol. 100, No. 4, pp. 2197-2202, Mar. 4, 2003.

Donoho, D.L., "Compressed sensing", IEEE Transactions on Information Theory, vol. 52, issue 4, pp. 1289-1306, Apr. 2006.

Candes et al., "Robust uncertainty principles: Exact signal reconstruction from highly incomplete frequency information", IEEE Transactions on Information Theory, vol. 52, No. 2, pp. 489-509, Feb. 2006.

Laskin et al., "A 60 mW per Lane, 4×23-Gb/s 27-1 PRBS Generator", IEEE Journal on Solid-State Circuits, vol. 41, No. 10, pp. 2198-2208, Oct. 2006.

Gardner, F., "Properties of frequency difference detectors", IEEE Transactions on Communications, vol. 33, No. 2, pp. 131-138, Feb. 1985.

Landau, H.J., "Necessary density conditions for sampling and interpolation of certain entire functions", Acta Mathematica, vol. 177, No. 1, pp. 37-52, Feb. 1967.

Johansson et al., "Reconstruction of nonuniformly sampled bandlimited signals by means of digital fractional delay filters", IEEE Transactions on Signal Processing, vol. 50, No. 11, pp. 2757-2767, Nov. 2002.

Nyquist, H., "Certain Topics in Telegraph Transmission Theory", Proceedings of the IEEE, vol. 90, No. 2, pp. 280-305, Feb. 2002 (reprinted from Transactions of A.I.E.E, vol. 47, No. 2, pp. 617-644, Apr. 1928).

Friis, H. T., "Noise figures of radio receivers", Proceedings of the IRE, vol. 32, No. 7, pp. 419-422, Jul. 1944.

Tropp, J. A., "Algorithms for simultaneous spare approximation. Part I: Greedy pursuit", Special Issue on Sparse Approximations in Signal and Image Processing, vol. 86, pp. 572-588, Apr. 2006.

Crols et al., "Low-IF topologies for high-performance analog front ends of fully integrated receivers", IEEE Transactions on Circuits & Systems—I: Analog and Digital Signal Processing, vol. 45, No. 3, pp. 269-282, Mar. 1998.

Elbornsson et al., "Blind equalization of time errors in a time-interleaved ADC system", IEEE Transactions on Signal Processing, vol. 53, No. 4, pp. 1413-1424, Apr. 2005.

Laska et al., "Theory and implementation of an analog-to-information converter using random demodulation", IEEE Proceedings of International Symposium on Circuits and Systems, pp. 1959-1962, New Orleans, USA, May 27-30, 2007.

Le et al., "Analog-to-digital converters", IEEE Signal Processing Magazine, vol. 22, No. 6, pp. 69-77, Nov. 2005.

Cotter et al., "Sparse solutions to linear inverse problems with multiple measurement vectors", IEEE Transactions on Signal Processing, vol. 53, No. 7, pp. 2477-2488, Jul. 2005.

Venkataramani et al., "Perfect reconstruction formulas and bounds on aliasing error in sub-Nyquist nonuniform sampling of multiband signals", IEEE Transactions on Information Theory, vol. 46, No. 6, pp. 2173-2183, Sep. 2000.

Unser, M., "Sampling—50 years after Shannon", Proceedings of the IEEE, vol. 88, No. 4, pp. 569-587, Apr. 2000.

Vetterli et al., "Sampling signals with finite rate of innovation", IEEE Transactions on Signal Processing, vol. 50, No. 6, pp. 1417-1428, Jun. 2002.

Mitoja, J., "Cognitive radio for flexible mobile multimedia communications", Mobile Networks and Applications, vol. 6, issue 5, pp. 435-441, Sep. 2001.

Alon et al., "Simple constructions of almost k-wise independent random variables", Proceedings of the 31st Annual Symposium on Foundations of Computer Science, vol. 2, pp. 554-553, St. Louis, USA, Oct. 22-24, 1990.

Carvalho et al., "Compact formulas to relate ACPR and NPR to two-tone IMR and IP3", Microwave Journal, vol. 42, No. 12, Dec. 1999.

Boutin et al., "An arctangent type wideband PM/FM demodulator with improved performances", Proceedings of the 33rd Midwest Symposium on Circuits and Systems, pp. 460-463, Calgary, Canada, Aug. 12-14, 1990.

Feng et al., "Spectrum-blind minimum-rate sampling and reconstruction of multiband signals", Proceedings of IEEE International Conference on ASSP, vol. 2, pp. 1688-1691, May 1996.

Vaidyanathan et al., "Generalizations of the sampling theorem: Seven decades after Nyquist", IEEE Transactions on Circuits & Systems—I: Fundamental Theory and Applications, vol. 48, No. 9, pp. 1094-1109, Sep. 2001.

Welch et al., "The use of fast Fourier transform for the estimation of power spectra: A method based on time averaging over short, modified periodograms", IEEE Transactions on Audio and Electroacoustics, vol. 15, No. 2, pp. 70-73, Jun. 1967.

Baraniuk et al., "A simple proof of the restricted isometry property for random matrices," Constructive Approximation, Feb. 5, 2007.

Chen et al., "Atomic decomposition by basis pursuit", SIAM Review, vol. 43, No. 1, pp. 129-159, year 2001 (published originally in SIAM Journal on Scientific Computing, vol. 20, No. 1, pp. 33-61, Aug. 1998).

Huang et al., "Blind calibration of timing offsets for four-channel time-interleaved ADCs", IEEE Transactions on Circuits & Systems—I: Regular papers, vol. 54, No. 4, pp. 863-876, Apr. 2007.

Vaughan et al., "The theory of bandpass sampling", IEEE Transactions on Signal Processing, vol. 39, No. 9, pp. 1973-1984, Sep. 1991.

Walden, R.H., "Analog-to-digital converter survey and analysis", IEEE Journal on Selected Areas in Communication, vol. 17, No. 4, pp. 539-550, Apr. 1999.

Pickoltz et al., "Theory of Spread-Spectrum Communications—A Tutorial", IEEE Transactions on Communications, vol. 30, No. 5, pp. 855-884, May 1982.

* cited by examiner

EFFICIENT SAMPLING AND RECONSTRUCTION OF SPARSE MULTI-BAND SIGNALS

CROSS-REFERENCE TO RELATED APPLICATIONS

This application claims the benefit of U.S. Provisional Patent Application 61/153,438, filed Feb. 18, 2009, U.S. Provisional Patent Application 61/247,030, filed Sep. 30, 2009, and U.S. Provisional Patent Application 61/265,365, filed Dec. 1, 2009, whose disclosures are incorporated herein by reference.

FIELD OF THE INVENTION

The present invention relates generally to signal sampling and reconstruction, and particularly to methods and systems for sampling and reconstructing multi-band signals.

BACKGROUND OF THE INVENTION

Various systems and applications involve processing of multi-band signals, i.e., signals whose spectral density is concentrated in a set of one or more distinct spectral bands. Multi-band signals are encountered, for example, in wireless communication systems, spectrum management applications, radar systems, medical imaging systems, among others. In many of these applications, an information-carrying analog multi-band signal is sampled, i.e., converted into digital samples. The information is then reconstructed by processing the digital samples.

SUMMARY OF THE INVENTION

An embodiment of the present invention that is described herein provides a method for signal processing, including:

distributing an analog input signal to a plurality of processing channels;

in each processing channel, mixing the input signal with a respective periodic waveform including multiple spectral lines, so as to produce a respective baseband signal in which multiple spectral slices of the input signal are superimposed on one another; and digitizing the baseband signal produced in each of the processing channels, to produce a set of digital sample sequences that represent the input signal.

In some embodiments, the method includes filtering the baseband signal in each processing channel before digitizing the signal. In an embodiment, filtering the baseband signal includes filtering the signal using a Low-Pass Filter (LPF) having a bandwidth of a single spectral slice, and digitizing the baseband signal includes sampling the signal at a sampling rate that is equivalent to the bandwidth. In an alternative embodiment, filtering the baseband signal includes filtering the signal using a Low-Pass Filter (LPF) having a bandwidth that is larger than a single spectral slice, and digitizing the baseband signal includes sampling the signal at a sampling rate that is equivalent to the bandwidth.

In some embodiments, the method includes receiving respective digital sample sequences from the processing channels, and reconstructing one or more features of the input signal by processing the digital sample sequences. In an embodiment, reconstructing the features includes generating an analog estimate of the input signal. In another embodiment, the input signal includes one or more signal components in respective spectral bands, and reconstructing the features includes generating an analog estimate of at least one of the signal components. In yet another embodiment, reconstructing the features includes identifying respective band edges of the spectral bands. In still another embodiment, reconstructing the features includes identifying respective carrier frequencies of the spectral bands. In an embodiment, the input signal includes one or more signal components that carry data in respective spectral bands, and reconstructing the features includes demodulating at least one of the signal components so as to reconstruct the data.

In some embodiments, processing the digital sample sequences includes identifying a subset of the spectral slices containing signal energy, and reconstructing the features responsively to the identified subset.

In a disclosed embodiment, identifying the subset includes constructing an algebraic basis represented by a V matrix for the digital sample sequences, finding a U matrix that is a sparsest solution of V=CU, wherein C includes a matrix of Fourier series coefficients of the periodic waveforms, and identifying the subset responsively to respective indices of non-zero elements of the U matrix. In an embodiment, constructing the algebraic basis includes integrating a vector of the digital sample sequences multiplied by a transpose of the vector, to produce a Q matrix representing the basis, and finding the U matrix for V=Q. In another embodiment, constructing the algebraic basis includes integrating a vector of the digital sample sequences multiplied by a transpose of the vector, to produce a Q matrix representing the basis, and decomposing the Q matrix so as to represent the Q matrix as a complex conjugate of the V matrix multiplied by the V matrix. In some embodiments, finding the U matrix includes solving V=CU using a Multiple-Measurement Vector (MMV) process.

In some embodiments, mixing the input signal, digitizing the baseband signal and reconstructing the features are performed in a single semiconductor device. In an embodiment, the input signal includes one or more signal components in respective spectral bands, and mixing the input signal, digitizing the baseband signal and reconstructing the features are performed irrespective of frequencies of the respective spectral bands. In another embodiment, the input signal includes one or more signal components in respective spectral bands whose frequencies are known a-priori. In some embodiments, the method further includes pre-equalizing a frequency response of the input signal in at least one of the processing channels before mixing the input signal with the respective periodic waveform. Additionally or alternatively, the method includes adjusting a power level of the periodic waveform in at least one of the processing channels before mixing the input signal with the periodic waveform.

In some embodiments, the method includes generating the respective periodic waveform for at least one of the processing channels using a digital shift register. Generating the periodic waveform may include generating multiple different periodic waveforms, for mixing with the input signal in the respective processing channels, from respective different taps of the shift register. In a disclosed embodiment, generating the periodic waveform includes cascading two or more shift register devices to form the shift register, and generating the periodic waveform using the cascaded shift register devices.

In some embodiments, the input signal includes a communication signal carrying multiple communication channels. The communication channels may be part of a cognitive radio system. In alternative embodiments, the input signal includes a radar signal, a medical imaging signal, an acoustic echo signal, a speech signal and/or an image signal. In an embodiment, distributing and mixing the input signal and digitizing the baseband signal are performed in a spectrum analyzer that analyzes the input signal. Alternatively, distributing and mixing the input signal and digitizing the baseband signal are performed in a communication switchboard that processes the input signal.

There is additionally provided, in accordance with an embodiment of the present invention, apparatus for signal processing, including:

a plurality of processing channels for processing an analog input signal, each of which processing channels includes:

a mixer, which is configured to mix the input signal with a respective periodic waveform including multiple spectral lines, so as to produce a respective baseband signal in which multiple spectral slices of the input signal are superimposed on one another; and an Analog-to-Digital Converter (ADC), which is configured to digitize the baseband signal produced in each of the processing channels, to produce a respective digital sample sequence.

There is also provided, in accordance with an embodiment of the present invention, a receiver, including:

a front end, which is configured to receive an analog input signal;

a plurality of processing channels, each of which processing channels includes:

a mixer, which is configured to mix the input signal with a respective periodic waveform including multiple spectral lines, so as to produce a respective baseband signal in which multiple spectral slices of the input signal are superimposed on one another; and an Analog-to-Digital Converter (ADC), which is configured to digitize the baseband signal produced in each of the processing channels, to produce a respective digital sample sequence; and a reconstruction unit, which is configured to receive respective digital sample sequences from the processing channels and to reconstruct one or more features of the input signal by processing the digital sample sequences.

The present invention will be more fully understood from the following detailed description of the embodiments thereof, taken together with the drawings in which:

DETAILED DESCRIPTION OF EMBODIMENTS

Overview

Figure 1:
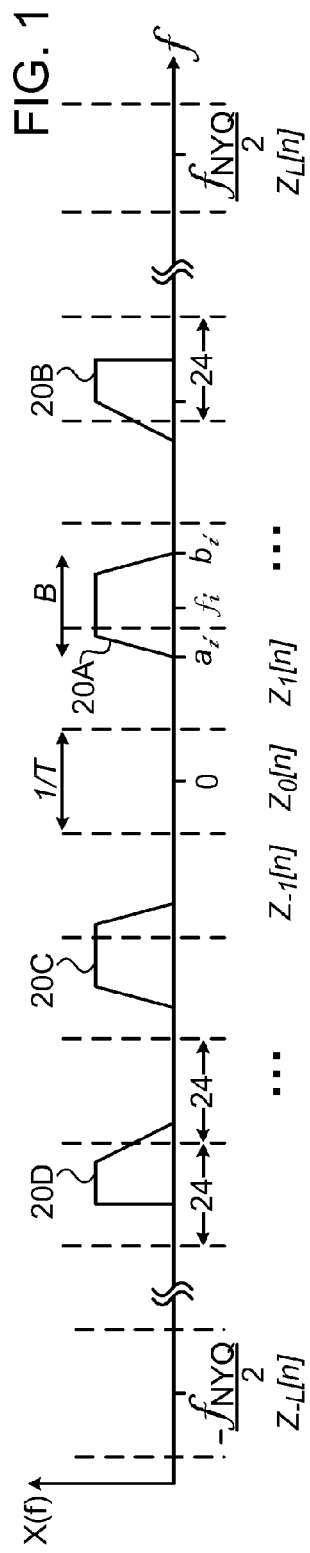
FIG. 1 is a schematic spectral plot of a sparse multi-band signal, in accordance with an embodiment of the present invention.

Embodiments of the present invention that are described hereinbelow provide improved methods and systems for sampling and reconstruction of analog multi-band signals. The disclosed techniques sample an analog multi-band input signal at a sampling rate that is considerably lower than the Nyquist rate of the signal, without requiring any prior knowledge as to the frequencies of the signal's spectral bands.

In some embodiments, a sampling unit samples the input signal using a set of processing channels operating in parallel. Each processing channel comprises a mixer that mixes the input signal with a respective wideband, periodic waveform. Each periodic waveform is designed to have a comb-shaped spectrum comprising multiple spectral lines. Therefore, mixing the input signal with such a waveform produces a baseband signal in which multiple spectral slices of the input signal are superimposed on one another. After mixing, the baseband signal is filtered by a low-pass filter. The baseband signals produced in the multiple processing channels are digitized using respective Analog-to-Digital Converters (ADCs), so as to produce a set of digital sample sequences that represent the analog multi-band input signal.

In some embodiments, a reconstruction unit reconstructs various features of the analog multi-band input signal from the set of digital sample sequences. The reconstruction unit may reconstruct, for example, the analog multi-band input signal itself, individual signal components located in the individual bands of the multi-band signal, the carrier frequencies and/or band edges of the signal components, and/or the data conveyed by the signal components. Several reconstruction techniques, which efficiently unwrap the superimposed spectral slices in the baseband signals, are described herein.

Due to the novel use of wideband periodic waveforms for down-conversion and the associated reconstruction techniques, the methods and devices described herein can sample and reconstruct sparse analog multi-band signals using hardware that operates far below the Nyquist rate of the signal. As a result, wideband signals can be processed using low-cost ADCs and other hardware, and in some cases using Digital Signal Processing (DSP) software. Moreover, the disclosed techniques enable sampling and reconstruction of signals whose bandwidth exceeds the capability of known sampling schemes.

In an example implementation described herein, a sparse multi-band signal having a Nyquist frequency of 2 GHz is sampled and reconstructed. Using the sparseness property of the signal (i.e., the fact that the components of the multi-band signal occupy only a small portion of the overall spectrum), the signal is sampled without information loss using four ADCs, each operating at a sampling rate of 60 MHz.

Several example techniques for generating wideband, periodic waveforms to be used in the disclosed sampling processes are described herein. Circuits for driving the mixers with such waveforms, and for equalizing the frequency responses of the resulting baseband signals, are also described.

In one embodiment, the techniques described herein can be implemented at chip level. For example, a single semiconductor device may comprise an analog front end, multiple processing channels, and reconstruction circuitry. Such a device may accept a multi-band analog input signal, and output the multiple narrowband components of this signal without prior knowledge of their spectral locations. Additionally or alternatively, the device may output the data conveyed by the signal components and/or their carrier frequencies.

The methods and systems described herein can be used regardless of whether the carrier frequencies of the individual signal components of the multi-band signal are known or not. In either case, the disclosed techniques offer a powerful and flexible demodulator architecture that operates far below the Nyquist rate of the signal. Although the embodiments described herein refer mainly to sparse signals, the disclosed techniques are in no way limited to this sort of signal, and can also be used with signals that occupy large portions of the Nyquist spectrum, or even the entire spectrum.

Sparse Multi-Band Signals

FIG. 1 is a schematic spectral plot of a sparse multi-band signal, in accordance with an embodiment of the present invention. The time-domain signal is denoted $x(t)$, and the spectrum of this signal, shown in FIG. 1, is denoted $X(f)$. The Nyquist frequency of the signal (typically defined as twice the highest possible frequency in the signal) is denoted $f_{NYQ}$. Thus, $X(f)$ is defined in the range $[-f_{NYQ}/2, f_{NYQ}/2]$. The multi-band signal $X(f)$ shown in FIG. 1 comprises N signal components, each occupying a certain sub-band within the range $[-f_{NYQ}/2, f_{NYQ}/2]$. Although the embodiments described herein refer mainly to multiple signal components, the disclosed techniques can also be used with a signal having only a single component, i.e., $N=1$. In the present example, two signal components 20A and 20B are shown. (FIG. 1 shows a real representation, in which an image of the signal occupies the negative half of the range $[-f_{NYQ}/2, f_{NYQ}/2]$. In this example, signal components 20A and 20B have images 20C and 20D, respectively.) The $i^{th}$ signal component occupies the interval $[a_i, b_i]$ and has a center frequency $f_i$. The bandwidth of the widest sub-band interval is denoted B. The term "sparse" refers to the fact that the multiple signal components occupy only a small percentage (e.g., 10% or less) of the range $[-f_{NYQ}/2, f_{NYQ}/2]$.

The spectral range $[-f_{NYQ}/2, f_{NYQ}/2]$ is divided into $M=2L+1$ slices 24. Each slice 24 has a bandwidth of 1/T for some T, such that $1/T \geq B$. Signal $x(t)$ is typically sparse, i.e., spectrum $X(f)$ has non-zero values only in a relatively small portion of the range $[-f_{NYQ}/2, f_{NYQ}/2]$. In other words, $X(f)$ has non-zero values only in a relatively small number of slices 24. The spectrum of the $i^{th}$ slice is denoted $z_i[n]$, $-L \leq i \leq L$.

The techniques described herein sample signal $x(t)$ using hardware that operates at the rate 1/T, which is considerably less than the Nyquist rate $f_{NYQ}$. Nevertheless, the techniques described herein are able to reconstruct the information conveyed by the signal with no information loss. Both sampling and reconstruction are performed regardless of any prior knowledge as to the locations of the signal components (i.e., of intervals $[a_i, b_i]$) in the signal spectrum. The techniques described herein are useful both in applications in which the spectral locations of the signal components are known, and in applications in which they are unknown a-priori.

In the embodiments described herein, the entire spectral response of the multi-band signal is confined to the N sub-bands, and no energy falls outside these sub-bands. However, the methods and systems described herein can also be used with signals in which a small fraction of the signal energy falls outside the sub-bands. Such signals are also regarded herein as multi-band signals. Although the description that follows mainly addresses complex signal representation, this choice is made purely for the sake of clarity. The methods and systems described herein can be adapted in a straightforward manner and used with real-valued signals, as well. Although applicable to a wide variety of signal types, the methods and systems described herein are particularly advantageous for sampling and reconstructing sparse multi-band signals, in which the cumulative bandwidth of the signal sub-bands is small with respect to the size of the range $[-f_{NYQ}/2, f_{NYQ}/2]$.

System Description

Figure 2:
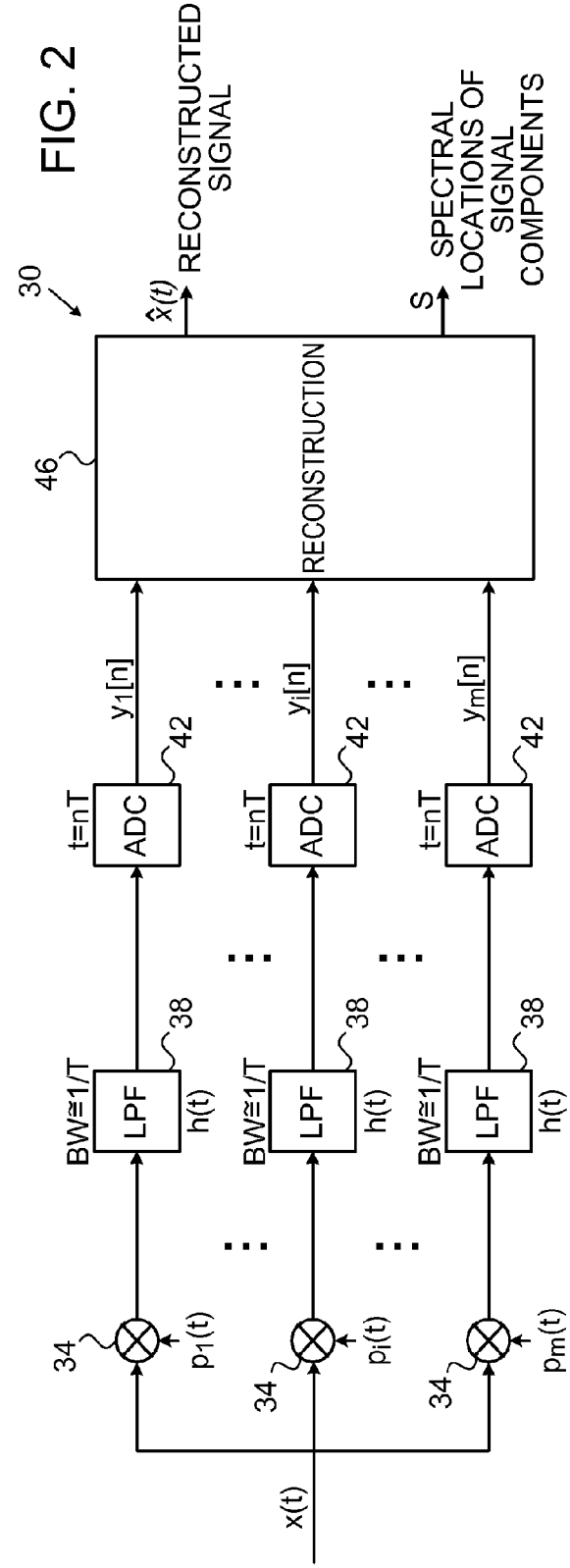
FIG. 2 is a block diagram that schematically illustrates a system for sampling and reconstruction of sparse multi-bands, in accordance with an embodiment of the present invention.

FIG. 2 is a block diagram that schematically illustrates a system 30 for sampling and reconstruction of sparse multi-band signals, in accordance with an embodiment of the present invention. System 30 samples and reconstructs signal $x(t)$ using hardware that operates at the rate 1/T. Typically, 1/T is chosen to be on the order of B, the bandwidth of the individual signal components of $x(t)$. Consequently, the configuration of system 30 is able to sample and reconstruct extremely wideband signals using hardware that operates at readily achievable clock rates.

Signal $x(t)$ is provided as input to system 30, and is sampled by m processing channels. Typically although not necessarily, m is chosen to be on the order of N, the number of signal components of $x(t)$. Each processing channel comprises a mixer 34, a Low-Pass Filter (LPF) 38 and an Analog-to-Digital Converter (ADC) 42. In the $i^{th}$ processing channel, mixer 34 mixes signal $x(t)$ with a wideband, periodic waveform denoted $p_i(t)$. Waveform $p_i(t)$ typically has a period of T. As such, the spectrum of $p_i(t)$ is comb-shaped, and comprises a series of spectral lines (impulses) that are spaced 1/T Hz from one another.

When mixing $x(t)$ with such a periodic waveform, each mixer 34 generates multiple replicas of $x(t)$, which are frequency-shifted by different multiples of 1/T. In particular, the interval $[-½T, ½T]$ at the mixer output comprises multiple different slices 24 of signal $x(t)$, which are frequency-shifted to baseband and superimposed on one another. In each processing channel, the relative weights given to slices 24 in the superposition depend on the periodic waveform used in that channel.

In the embodiment of FIG. 2, LPFs 38 have an impulse response denoted $h(t)$ and a bandwidth of 1/T. Therefore, LPF 38 in each processing channel filters the mixer output so as to retain substantially only the above-described interval $[-½T, ½T]$. ADC 42 in each processing channel samples the LPF output at $t=nT$ intervals, i.e., at a rate of 1/T. ADC 42 in the $i^{th}$ processing channel produces a sequence of digital samples denoted $y_i[n]$. (In alternative embodiments, the number of processing channels can be reduced by increasing the bandwidths of LPFs 38 and the sampling rates of ADCs 42, as will be described further below.)

In summary, the m processing channels of system 30 produce m discrete-time digital sample sequences $y_i[n]$, $i=1 \ldots m$, which represent the analog multi-band input signal. The spectrum of each sequence $y_i[n]$ lies in the interval $[-½T, ½T]$, and comprises a certain superposition of spectral slices

24 of X(f). Since periodic waveforms $p_i(t)$ are different from one another, the superpositions produced by different processing channels are different from one another, as well.

System 30 comprises a signal reconstruction unit 46, which processes sequences $y_i[n]$ so as to reconstruct analog signal x(t). The reconstructed signal is denoted $\hat{x}(t)$. In some embodiments, unit 46 produces the analog wideband signal $\hat{x}(t)$. In alternative embodiments, unit 46 may produce N narrowband signals that reproduce the N sub-bands of x(t), or a certain subset of the N sub-bands. Additionally or alternatively, unit 46 may demodulate the data conveyed by the N sub-bands, or a certain subset of the N sub-bands. In some embodiments, reconstruction unit 46 also identifies the spectral locations of the N sub-bands occupied by signal x(t). These spectral locations are referred to as the spectral support of the signal, denoted S. Several example implementations of reconstruction unit 46 are described in FIGS. 5 and 6 below.

The advantages of the sampling scheme of FIG. 2 can be more easily understood by comparing system 30 to a theoretical system, in which each processing channel mixes the input signal with a single sinusoidal waveform rather than with a wideband periodic waveform such as $p_i(t)$. The description that follows describes a theoretical configuration of this sort.

Figure 3:
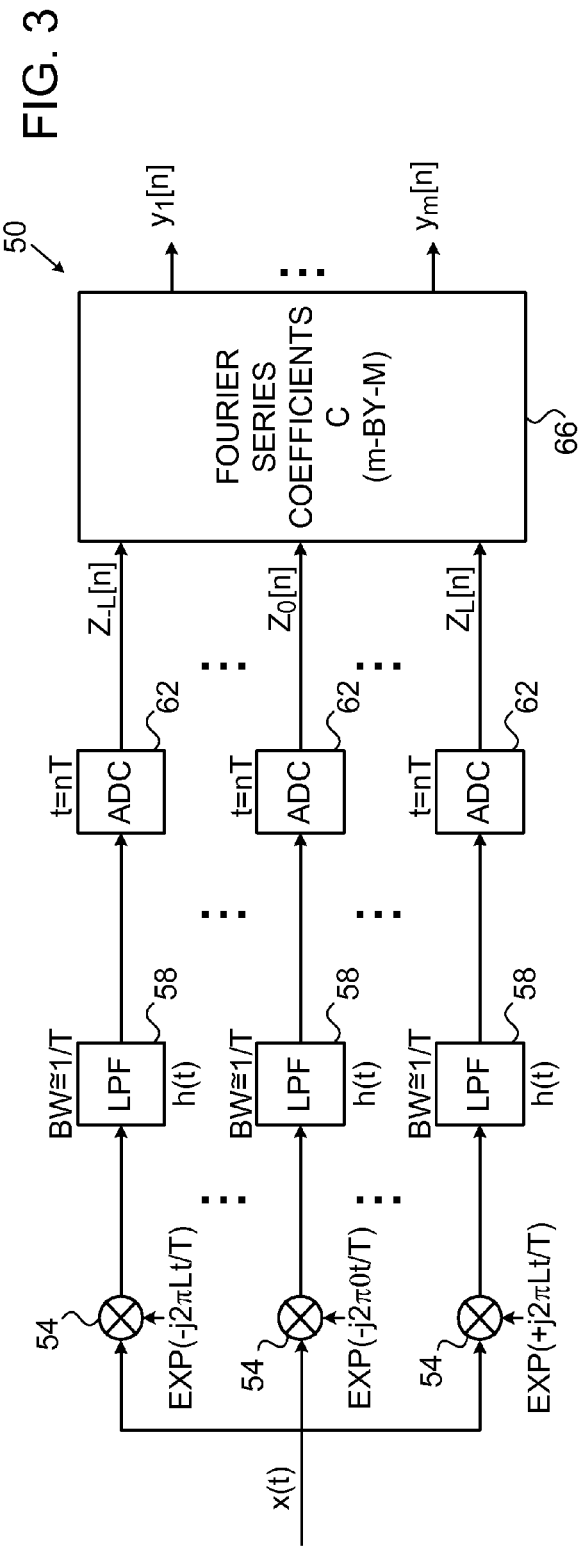
FIG. 3 is a block diagram that schematically illustrates a theoretical system configuration for sampling and reconstruction of sparse multi-band signals, in accordance with an embodiment of the present invention.

FIG. 3 is a block diagram that schematically illustrates a theoretical system 50 for sampling and reconstruction of sparse multi-band signals, in accordance with an embodiment of the present invention. System 50 comprises multiple processing channels, each comprising a mixer 54, a LPF 58 and an ADC 62. Unlike system 30, in system 50 each mixer performs conventional down-conversion, i.e., mixes x(t) with a single sinusoidal waveform.

In order to process the entire interval $[-f_{NYQ}/2, f_{NYQ}/2]$ using conventional down-conversion, however, system 50 is required to have at least M=2L+1 processing channels, each channel down-converting and sampling a respective spectral slice 24 of signal x(t). Each mixer 54 in system 50 mixes x(t) with a single sinusoidal waveform of the form $e^{j2\pi kt/T}$, $-L \leq k \leq L$, i.e., shifts the $k^{th}$ spectral slice to baseband. The output of each processing channel in system 50 comprises the spectrum of the respective slice 24 after shifting to baseband, i.e., $z_k[n]$, $-L \leq k \leq L$ (see FIG. 1).

As can be appreciated, the number of processing channels in system 50 is M—the number of spectral slices 24—regardless of how many of the slices actually contain signal energy. In many practical applications involving sparse multi-band signals, the number of spectral slices is very large and only a small fraction of them contain non-zero signal energy. In such cases, most of the processing channels in system 50 process unoccupied slices, and produce zero sequences. Therefore, the configuration of system 50 is extremely inefficient, and often impractical to implement.

In system 30 of FIG. 2, on the other hand, the number of processing channels is on the order of N—the actual number of occupied signal sub-bands. As such, the scheme of FIG. 2 takes full advantage of the fact that x(t) is sparse, and samples the signal using a practical number of processing channels. System 50 of FIG. 3 is referred to herein as a theoretical system, and is described herein in order to demonstrate the effectiveness of system 30 of FIG. 2 above.

In the theoretical scheme of system 50, sequences $y_i[n]$ can be derived from sequences $z_k[n]$ using a conversion unit 66. At a given time (i.e., for a given n), unit 66 multiplies the M-element vector of $z_k[n]$ values by an m-by-M matrix denoted C, to produce an m-element vector of $y_i[n]$ values. Matrix C comprises the Fourier series coefficients of the periodic waveforms $p_i(t)$. The derivation of sequences $y_i[n]$ from sequences $z_k[n]$ is given by y[n]=Cz[n], wherein y[n] denotes an m-element vector containing the values of $y_i[n]$, i=1 ... m, for a given n, and z[n] denotes an M-element vector of containing the values of $z_k[n]$, k=1 ... M, for the same n. The coefficients of matrix C, denoted $c_{ij}$, are given by $$p_i(t) = \int_{t=-\infty}^{\infty} c_{ij} e^{j\frac{2\pi}{T}lt}. \quad [1]$$

System 30 of FIG. 2 above may use any suitable choice of parameters, e.g., T, B and M. Typically, the system is designed so that $1/T \geq B$ and $M \geq T \cdot f_{NYQ}$. In one example implementation, the system has four processing channels. In each processing channel, the cutoff frequency of LPF 38 is 30 MHz, and the sampling rate of each ADC 42 can be as low as 60 MHz. This example system configuration is able to process multi-band signals with Nyquist frequencies up to 2 GHz and a total bandwidth occupancy of up to 120 MHz. The overall sampling rate of this configuration is 240 MHz, i.e., approximately 10% of the input signal Nyquist rate. Higher bandwidth occupancy can be handled by increasing the number of processing channels. Nevertheless, each processing channel still operates at a low rate of 60 MHz. Alternatively, any other suitable configuration can also be used.

Figure 4:
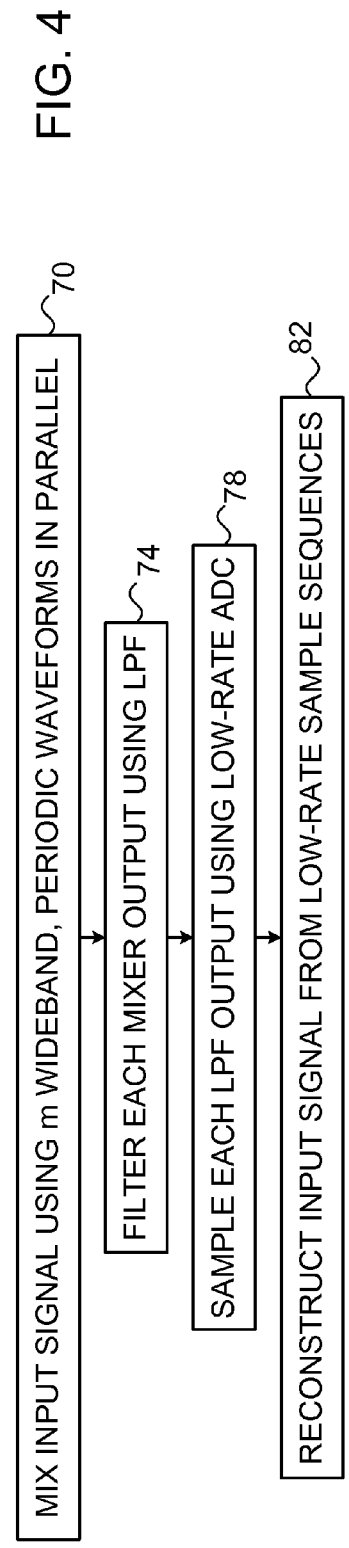
FIG. 4 is a flow chart that schematically illustrates a method for sampling and reconstruction of sparse multi-band signals, in accordance with an embodiment of the present invention.

FIG. 4 is a flow chart that schematically illustrates a method for sampling and reconstruction of sparse multi-band signals, carried out by system 30 of FIG. 2 above, in accordance with an embodiment of the present invention. The method begins with system 30 mixing input signal x(t) with m wideband, periodic waveforms $p_i(t)$ in parallel using mixers 34, at a mixing step 70. In each processing channel of system 30, LPF 38 filters the respective output of mixer 34, at a filtering step 74. In each processing channel, ADC 42 samples the filtered signal at the output of the respective LPF 38, at a sampling step 78. Reconstruction unit 46 processes the m sequences $y_i[n]$ produced by the ADCs, so as to produce signal $\hat{x}(t)$ that estimates input signal x(t), at a reconstruction step 82.

Signal Reconstruction Schemes

As noted above, reconstruction unit 46 of system 30 (FIG. 2) reconstructs the analog multi-band signal x(t) from the sequences $y_i[n]$ produced by the m parallel processing channels. The description that follows describes two example embodiments of the reconstruction unit. In alternative embodiments, however, the analog multi-band signal can be reconstructed from sequences $y_i[n]$ using any other suitable method.

Figure 5:
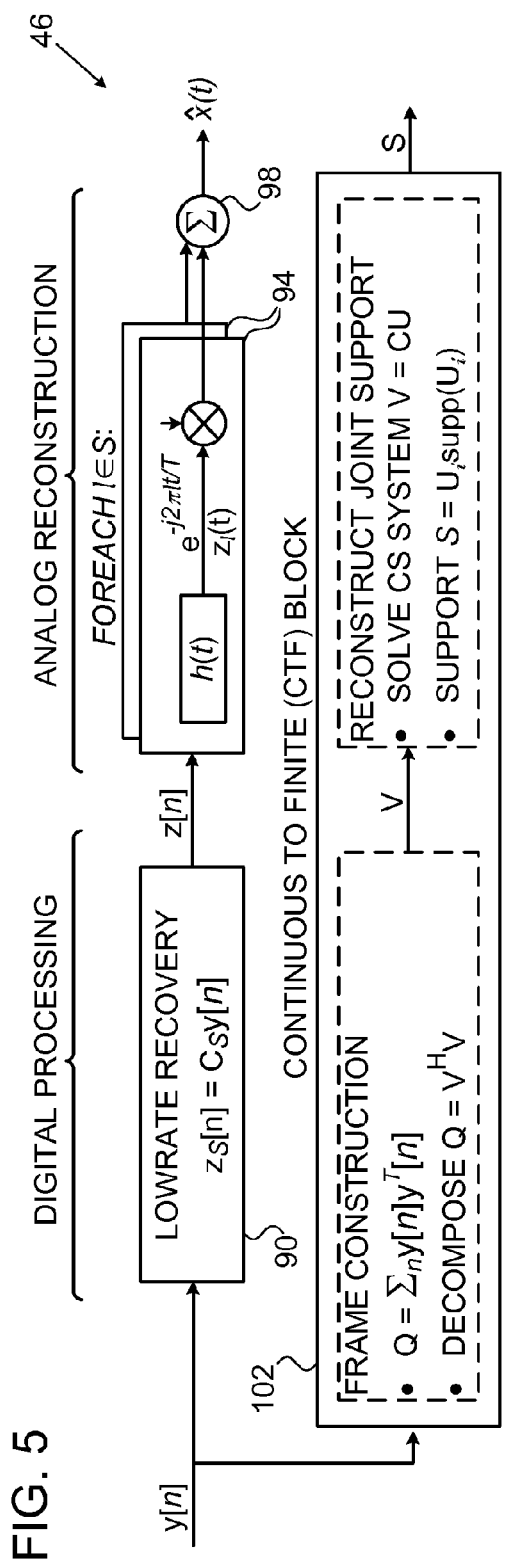
FIGS. 5 and 6 are block diagrams that schematically illustrate signal reconstruction units, in accordance with embodiments of the present invention.

FIG. 5 is a block diagram that schematically illustrates the internal structure of signal reconstruction unit 46, in accordance with an embodiment of the present invention. Unit 46 comprises a Continuous-To-Finite (CTF) module 102, which computes the spectral support S of signal X(f) based on one or more vectors y[n]. The spectral support is computed by identifying the columns of matrix C, defined in Equation 1 above, which correspond to the non-zero sequences $z_k[n]$ (and thus to the respective spectral slices 24 of signal x(t) that contain non-zero signal energy).

Further aspects of signal reconstruction using CTF processes are described by Mishali and Eldar in "Blind Multi-band Signal Reconstruction: Compressed Sensing for Analog Signals," IEEE Transactions on Signal Processing, volume 57, no. 3, March, 2009, pages 993-1009, in "Reduce and Boost: Recovering Arbitrary Sets of Jointly Sparse Vectors,"

IEEE Transactions on Signal Processing, volume 56, no. 10, October, 2008, pages 4692-4702, which is incorporated herein by reference, and in U.S. Patent Application Publication 2009/0068951, whose disclosure is incorporated herein by reference.

Module 102 begins the CTF process by computing a matrix Q, which is defined as $$Q=\Sigma_n y[n]y^T[n]. \qquad [2]$$

wherein $y^T[n]$ denotes the transpose of $y[n]$. In other words, module 102 sums or integrates a vector of the digital sample sequence multiplied by the transpose of this vector. In some embodiments, module 102 decomposes matrix Q, to produce a matrix V that is given by $$Q=V^H V \qquad [3]$$

wherein $V^H$ the complex conjugate of V. Matrix V can be derived from matrix Q using any suitable decomposition method known in the art. (The decomposition of matrix Q is regarded as an example of constructing an algebraic basis, or frame, than spans $y[n]$. Since Q itself is also a basis for $y[n]$, the decomposition step is not mandatory. Alternatively, module 102 may construct and use any other suitable basis that spans $y[n]$ using any other suitable process.) Using matrix V, module 102 calculates the sparsest solution of the equation $$V=CU. \qquad [4]$$

The sparsest solution of Equation [4] is denoted $\overline{U}$. Module 102 calculates the support S by merging the supports of all columns $\overline{U}_i$ of $\overline{U}$, i.e.:

$$S=U_i \text{supp}(\overline{U}_i) \qquad [5]$$

wherein $\text{supp}(\overline{U}_i)$ denotes the support of column $\overline{U}_i$. (The support of column $\overline{U}_i$ is defined as the set of indices of the non-zero elements in this column.)

Module 102 may use any suitable method for computing the sparsest solution of Equation [4] above. For example, module 102 may apply methods that are known in the art as Multiple Measurement Vector (MMV) methods. MMV methods are described, for example, by Chen and Huo in "Theoretical Results on Sparse Representations of Multiple Measurement Vectors," IEEE Transactions on Signal Processing, volume 54, December, 2006, pages 4634-4643, by Cotter et al., in "Sparse Solutions to Linear Inverse Problems with Multiple Measurement Vectors," IEEE Transactions on Signal Processing, volume 53, July, 2005, pages 2477-2488, by Donoho, in "Compressed Sensing," IEEE Transactions on Information Theory," volume 52, no. 4, April, 2006, pages 1289-1306, by Chen and Donoho in "Basis Pursuit," Proceedings of the Twenty-Eighth Asilomar Conference on Signals, Systems and Computers, Monterey, Calif., November, 1994, volume 1, pages 41-44, and by Mallat and Zhang in "Matching Pursuits with Time-Frequency Dictionaries," IEEE Transactions on Signal Processing, volume 41, number 12, pages 3397-3415, which are incorporated herein by reference. Any suitable MMV method, such as the methods cited above, may be used for this purpose.

In some embodiments, the overall sampling rate is increased to 4NB in order for the CTF process to function properly, although any other suitable sampling rate can also be used. For example, for N=6 and B=50 MHz, a sampling rate of 4NB=600 MHz can be achieved using m=4N=24 processing channels. Having determined the support S, module 102 computes the reduced matrix $C_S$, defined as the subset of columns of C whose indices are indicated by the support S. Unit 46 then computes a the pseudo-inverse of $C_S$, denoted $C_S^+$.

Reconstruction unit 46 comprises a low-rate recovery module 90, which calculates the reduced vector subset $z_S[n]$ $=C_S^+ y[n]$. Sequences $z_S[n]$ comprise the subset of sequences $z_k[n]$ that actually contain signal energy. Since the signal is sparse, the number of sequences in $z_S[n]$ is considerably smaller than M—the total number of sequences $z_k[n]$.

Figure 7:
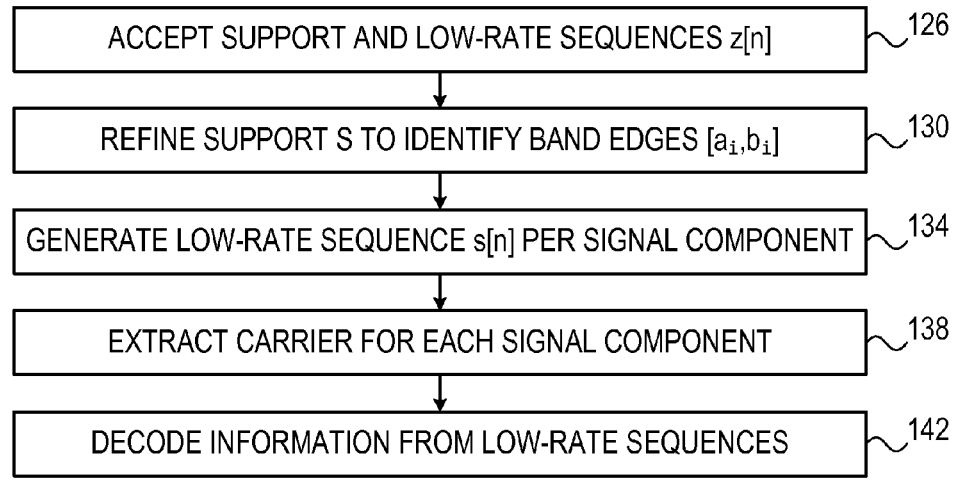
FIG. 7 is a flow chart that schematically illustrates a method for baseband processing of a multi-band signal, in accordance with an embodiment of the present invention.
Figure 8:
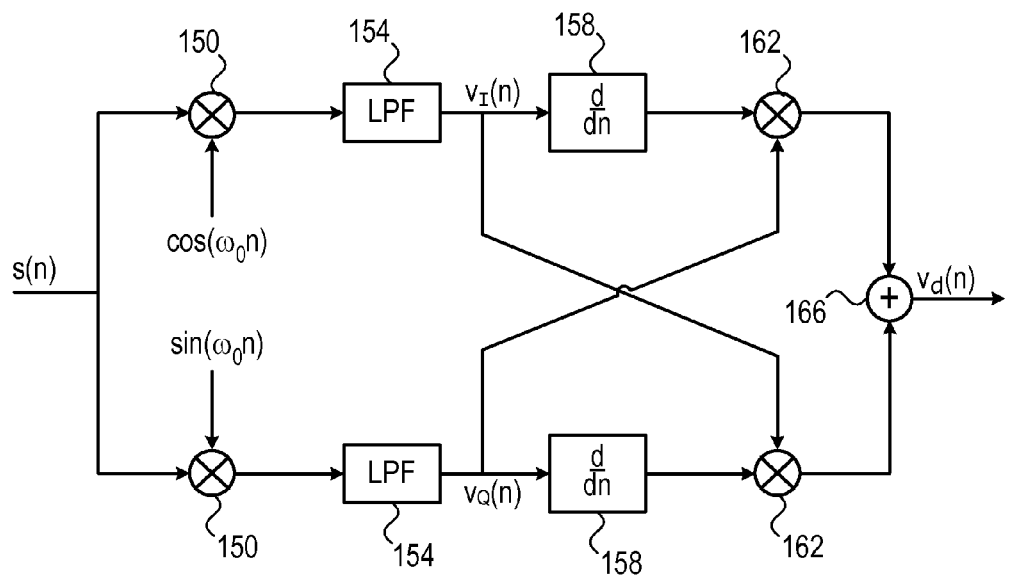
FIG. 8 is a block diagram that schematically illustrates a digitally-implemented carrier recovery process, in accordance with an embodiment of the present invention.

In some embodiments, reconstruction unit 102 comprises analog reconstruction modules 94, which reconstruct the analog signal from digital sequences $z_S[n]$. Typically, a respective module 94 operates on each sequence $z_S[n]$. Each digital sequence is filtered using $h(t)$, and then up-converted to the appropriate frequency. A combiner 98 combines the different reconstructed signals to produce $\hat{x}(t)$. In alternative embodiments, combiner 98 can be omitted, and unit 46 may output the individual reconstructed spectral slices produced by modules 94. (In some cases, however, the individual signal components of the multi-band signal may not fall within the spectral slice boundaries. In these cases, reconstructing the spectral slices may be less useful, since the real interest is often to reconstruct the signal components regardless of spectral slices in which they fall. Example techniques for reconstructing a signal component that may span more than one spectral slice are shown in FIGS. 7 and 8 below. These techniques can be used to produce a useful product in such cases.)

Figure 6:
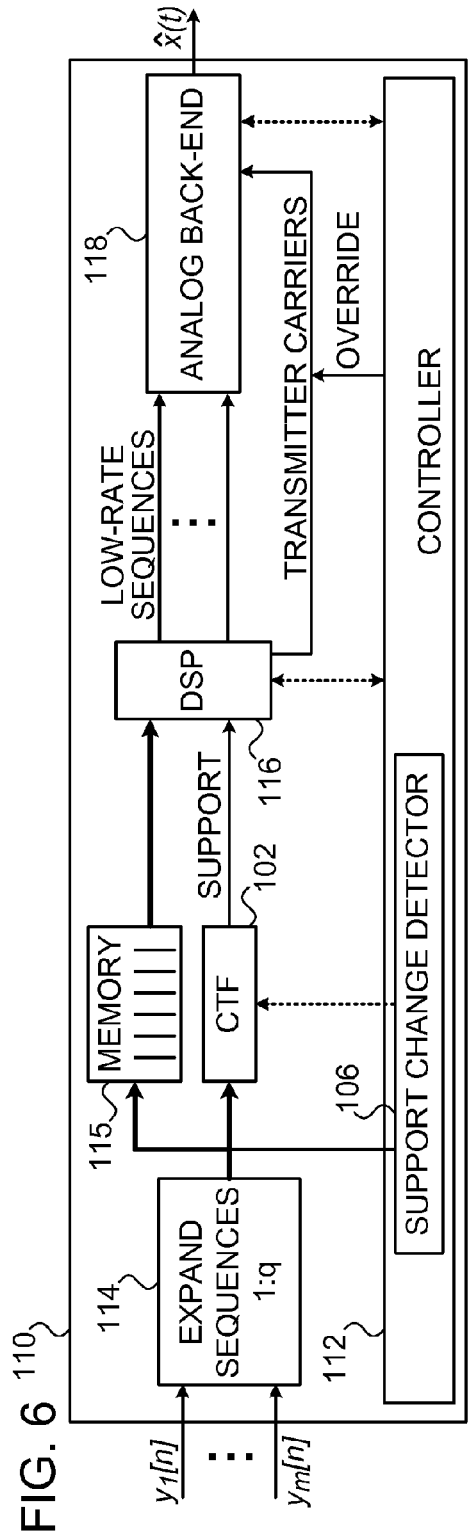

FIG. 6 is a block diagram that schematically illustrates a signal reconstruction unit 110, in accordance with an alternative embodiment of the present invention. In some embodiments, the configuration of FIG. 6 can be used to implement unit 46 in system 30 of FIG. 2 above. Unit 110 comprises a controller 112, which manages the reconstruction unit operation. Sequences $y_i[n]$ entering unit 110 are processed by an expansion unit 114, which generates q sequences from each sequence $y_i[n]$, by filtering each sequence $y_i[n]$ and then down-sampling by a factor of q.

The sequences are then processed by CTF module 102 (similar to module 102 in FIG. 5 above), so as to identify the support of signal $X(f)$, i.e., the subset of spectral slices 24 containing non-zero signal energy. Typically, controller 112 invokes CTF module 102 on initialization. In some embodiments, controller 112 comprises a support change detector module 106, which detects that the support has changed during system operation, and invokes CTF module 102 to identify the up-to-date support. Alternatively, the CTF module can be invoked in response to a notification from a higher application layer, indicating that the signal spectrum has changed.

Unit 110 comprises a First-In-First-Out (FIFO) memory 115, which stores a number of successive $y[n]$ vectors. These vectors are buffered so that, when the support changes, the CTF module has sufficient time to identify the new support before the recovery process of $z_S[n]$ requests this information. In the configuration of FIG. 6, recovery of $z_S[n]$ is performed by a Digital Signal Processor (DSP) device 116. Any suitable DSP device, such as various off-the-shelf DSP processors, can be used for this purpose. The DSP performs functions similar to those of module 90 in FIG. 5 above. An analog back-end 118 reconstructs the analog signal $\hat{x}(t)$ from the low-rate sequences $z_S[n]$. The analog back-end functions similarly to modules 94 and combiner 98 in FIG. 5 above. When the individual signal components $s_i[n]$ are known, e.g., using the techniques of FIGS. 7 and 8 below, back end 118 may reconstruct the analog signal by modulating each signal component $s_i[n]$ onto its respective carrier $f_i$.

In some embodiments, controller 112 configures back-end 118 to reconstruct only a desired subset of the sequences from $z[n]$ (spectral slices). Additionally or alternatively, controller 112 may request that one or more sequences be output at baseband, and not up-converted to their original carrier frequencies in x̂(t). For example, controller 112 may indicate these sequences to back-end 118 using suitable override signals.

Note that the sampling process performed by the parallel processing channels of system 30 (FIG. 2), and the reconstruction processes performed by reconstruction units 46 and 110 (FIGS. 5 and 6) are carried out in a spectrum-blind manner, i.e., without prior knowledge as to the spectral locations of the signal components of signal x(t). As noted above, these processes are useful in scenarios in which the carrier frequencies are unknown, as well as in scenarios in which the carrier frequencies are known in advance.

Reducing the Number of Processing Channels

In system 30 of FIG. 2 above, each processing channel filters the input signal with a bandwidth of approximately 1/T (the bandwidth of a single spectral slice 24) and then samples the signal at a sampling rate of $f_s=1/T$. In some embodiments, the number of processing channels in the system can be reduced by increasing the ADC sampling rate of each channel to $q \cdot f_s$, wherein q is typically an odd factor. The bandwidths of the LPFs are also increased by a similar factor. In these embodiments, each channel typically comprises q digital filters (not shown in the figure) following the ADC. These digital filters separate the sampled signal at the ADC output into q sequences $y_i[n]$, as would have been produced by the narrowband processing channels of FIG. 2. Using this technique, the number of processing channels is reduced by a factor of q, at the expense of higher sampling rate per channel and some additional filtering hardware.

In these embodiments, the ADC sampling rate and the LPF bandwidth can be set to any suitable values that are larger than the bandwidth of a single spectral slice 24, and not necessarily to an integer multiple of the spectral slice bandwidth.

Spectral Support Refinement and Carrier Frequency Extraction

In some embodiments, DSP 116 of FIG. 6 may perform various baseband processing functions on the sampled sequences z[n]. Various kinds of baseband processes can be applied, depending on the specific application. For example, the DSP may decode the data modulated onto the different components of multi-band signal x(t).

FIG. 7 is a flow chart that schematically illustrates a method for baseband processing of a multi-band signal, in accordance with an embodiment of the present invention. In this example, the DSP identifies the band edges $[a_i, b_i]$ of the different signal components of x(t) at high accuracy. In addition, the DSP produces low-rate sample sequences representing these signal components. Finally, the DSP extracts the carriers of the signal components, and demodulates the data conveyed by the signal components.

Note that the DSP may perform only certain parts of this process, depending on the application requirements. For example, some applications are only concerned in outputting the identified band edges of the signal. Other applications may be concerned with outputting the carrier frequencies, either with or without the corresponding band edges. Other applications may be concerned with full data demodulation of the signal components.

The method of FIG. 7 begin with DSP 116 accepting the estimated support S and the low-rate sequences z[n], as explained above, at an input step 126. Based on this information, the DSP identifies the actual band edges $[a_i, b_i]$ of the different signal components of x(t), at a band edge computation step 130. In some embodiments, the band edge identification process depends on two parameters, namely the minimal possible bandwidth of any individual signal component (denoted $B_{min}$), and the smallest possible spacing between signal components (denoted $\Delta_{min}$). Both parameters are typically known a-priori, at least to some extent.

In an example implementation, the DSP first converts the low-rate sequences z[n] from complex representation to real representation. Then, the DSP carries out a Power Spectral Density (PSD) estimation process, which estimates the actual signal power density as a function of frequency. Any suitable PSD estimation method can be used for this purpose. An example method is described by Welch, in "The Use of Fast Fourier Transform for the Estimation of Power Spectra: A Method Based on Time Averaging Over Short, Modified Periodograms," IEEE Transactions on Audio and Electroacoustics, volume 15, no. 2, 1967, pages 70-73, which is incorporated herein by reference.

In some embodiments, the DSP enhances the results of the PSD estimation process based on $B_{min}$ and $\Delta_{min}$. For example, the DSP may unite spectral intervals that are spaced closer than $\Delta_{min}$, and/or prune spectral intervals that are narrower than $B_{min}$. The output of this stage is a list of sub-bands, typically represented as a list of band edges $[a_i, b_i]$, corresponding to the different signal components of x(t).

DSP 116 now isolates and outputs a low-rate sequence for each identified signal component, at a sequence isolation step 134. Each isolated sequence, denoted $s_i[n]$, contains the contribution of a single respective signal component (e.g., components 20A and 20B in FIG. 1 above). Note that a given signal component may span two or more spectral slices 24. In some embodiments, the DSP identifies scenarios in which a given signal component spans multiple spectral slices 24 based on the identified band edges, and merges the parts of that component from the different slices. The DSP may apply appropriate digital filtering (e.g., band-pass, all-pass, low-pass or high-pass filtering, as appropriate) for this purpose.

DSP 116 now computes the carrier of each signal component (i.e., for each sequence $s_i[n]$), at a carrier recovery step 138. Any suitable carrier recovery method can be used for this purpose. An example method, which uses an analog balanced quadricorrelator, is described by Gardner, in "Properties of Frequency Difference Detectors," IEEE Transactions on Communication, volume 33, no. 2, February, 1985, pages 131-138, which is incorporated herein by reference. In some embodiments, DSP 116 applies a digital implementation of the analog balanced quadricorrelator. An implementation of this sort is shown in FIG. 8 below. Using the extracted carrier, DSP 116 demodulates the data carried by each signal component, at a demodulation step 142. Any suitable demodulation scheme can be applied for this purpose. The demodulated data is provided as output.

FIG. 8 is a block diagram that that schematically illustrates a digitally-implemented carrier recovery process, in accordance with an embodiment of the present invention. In this process, an isolated sequence s[n] is mixed with two quadrature components of a carrier sequence having an angular frequency $\omega_0 n$, using mixers 150. The mixer outputs are filtered by LPFs 154. Derivative modules 158 compute respective derivatives, with respect to n, of the LPF outputs. Modules 158 may apply difference filters or any other suitable type of filters in order to compute the derivatives. The output of each module 158 is mixed with the input of the other module 162 by a respective mixer 162. The outputs of mixers 162 are combined by a combiner 166, to produce an estimated carrier sequence $v_d[n]$. The different elements of FIG. 8 are typically implemented using suitable software functions running on DSP 116.

Mixing Circuit Configurations

Consider a given mixer 34 in one of the processing channels of system 30 of FIG. 2 above. This mixer accepts signal x(t) at its Radio frequency (RF) port, and a wideband periodic waveform $p_i(t)$ at its Local Oscillator (LO) port. This configuration is in sharp contrast to conventional mixer operation in which a single sinusoid is applied to the mixer's LO port. Periodic waveforms $p_i(t)$ are typically extremely wideband and contain a large number of spectral impulses. Applying a waveform of this sort to the mixer's LO port often causes the mixer to deviate from its specified performance, which is typically specified for a single-sinusoid LO signal. Thus, in some embodiments, system 30 comprises analog circuitry for pre-processing the signals applied to mixer 34, in order to achieve the desired mixing performance with $p_i(t)$.

Figure 9:
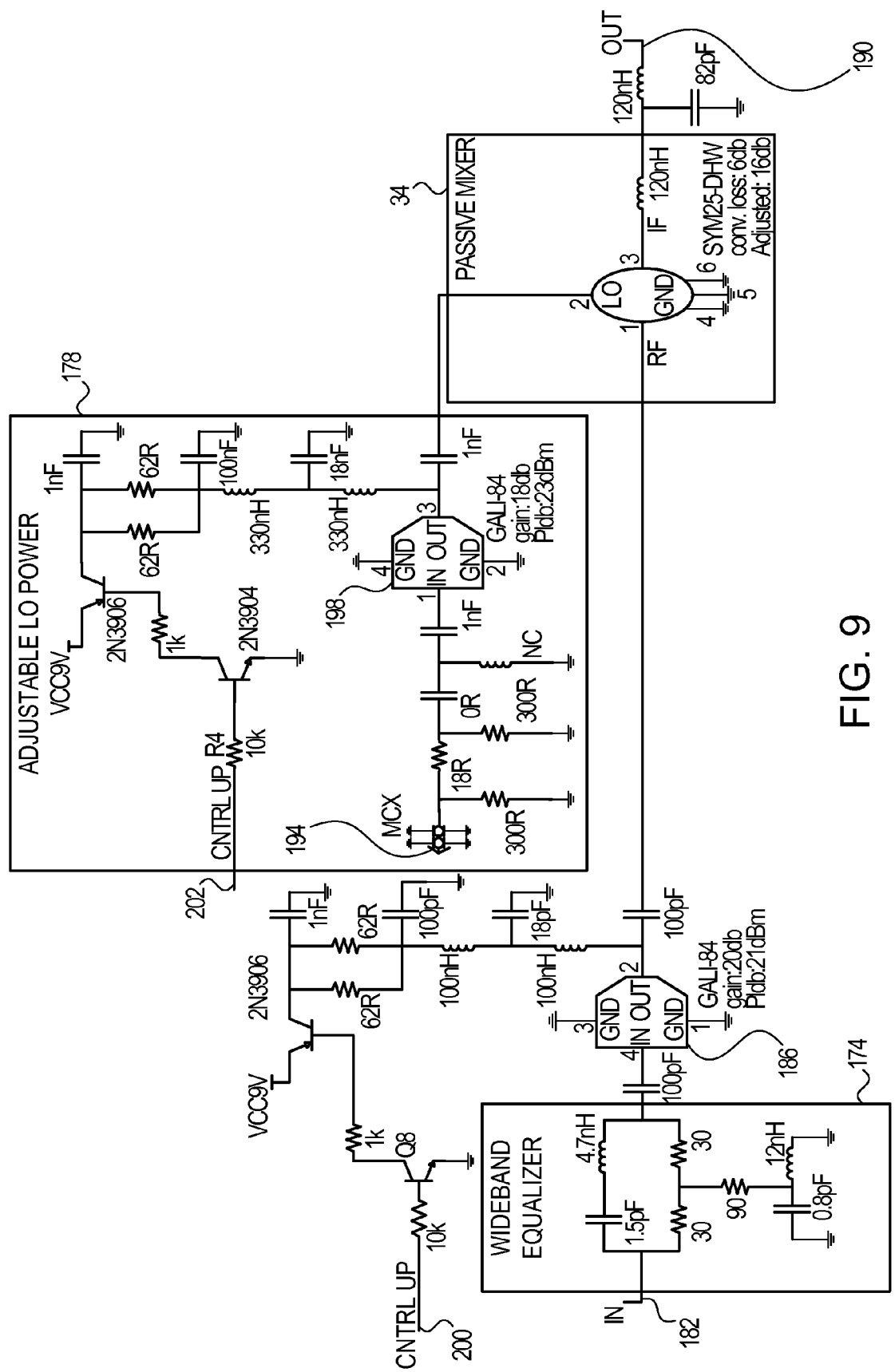
FIG. 9 is a circuit diagram of a mixing circuit, in accordance with an embodiment of the present invention.

FIG. 9 is a circuit diagram of a mixing circuit, in accordance with an example embodiment of the present invention. The circuit of FIG. 9 comprises a wideband equalizer 174, which pre-equalizes the frequency response of x(t). Signal x(t) enters the circuit of FIG. 9 at an input port 182, equalized by equalizer 174, amplified by an amplifier 188, and then provided to the RF port of mixer 34. The down-converted signal is output at the IF port of the mixer and provided to an output port 190 of the circuit. Without equalization, the mixing of x(t) with $p_i(t)$ causes the mixer to emphasize the higher end of the spectrum and attenuate the lower end of the spectrum. The gain difference across the spectrum may be significant, e.g., on the order of 8 dB. Equalizer 182 flattens the frequency response at output port 190, so as to reverse the frequency-dependent gain (loss) of the mixing operation.

Equalizer 174 typically comprises a network of passive components, e.g., resistors, capacitors and/or inductors, which equalize x(t) to the desired frequency response. In some embodiments, the equalizer applies higher attenuation to the lower frequencies of x(t), so as to reverse the opposite effect caused by the mixer. In alternative embodiments, any other suitable equalizer configuration, and any other frequency response, can be used.

The circuit of FIG. 9 further comprises an LO power control module 178, which controls the power of the LO signal (waveform $p_i(t)$) provided to the LO port of mixer 34. The LO signal is applied to a port 194 of the circuit. An amplifier 198 amplifies the LO signal, and the amplified LO signal is provided to the LO port of mixer 34. A control signal is applied to a port 202 of the circuit. The control signal indicates the desired gain to be applied to the LO signal before it is provided to the mixer's LO port. Module 178 adjusts the gain applied to the LO signal based on the control signal. The response of equalizer 174, and/or the LO signal power set by module 178, can be calculated and set using any suitable method, such as by empirical measurement and calibration.

In the example of FIG. 9, amplifier 186 can be selectively activated and de-activated by applying a control signal to a port 200 of the circuit. This control signal can be used for shutting down a given processing channel. In some embodiments, the system can adapt its sampling rate by selectively de-activating one or more of the processing channels using such control signals.

Generation of Wideband Periodic Waveforms

The wideband periodic waveforms $p_i(t)$ can be produced in various ways. In some embodiments, waveforms $p_i(t)$ are produced digitally using a digital shift register, which comprises multiple shift register stages. In an example implementation, the shift register stages are loaded with an initial pattern of "1" and "0" values, the shift register is clocked, and a certain shift register stage output is used to produce a respective wideband periodic waveform.

In some embodiments, the shift register is clocked at a clock rate of $f_{NYQ}$, the Nyquist frequency of x(t) defined above. As a result, the shift register output, as well as the output of any shift register stage, produces a pattern of "1" and "0" values that alternates at the rate of $f_{NYQ}$. The spectral response of this pattern depends on the initial pattern loaded to the shift register, and on the taps selected for producing the output. With proper selection of the initial pattern and taps, the shift register output can be designed to generate wideband waveforms $p_i(t)$.

Figure 10:
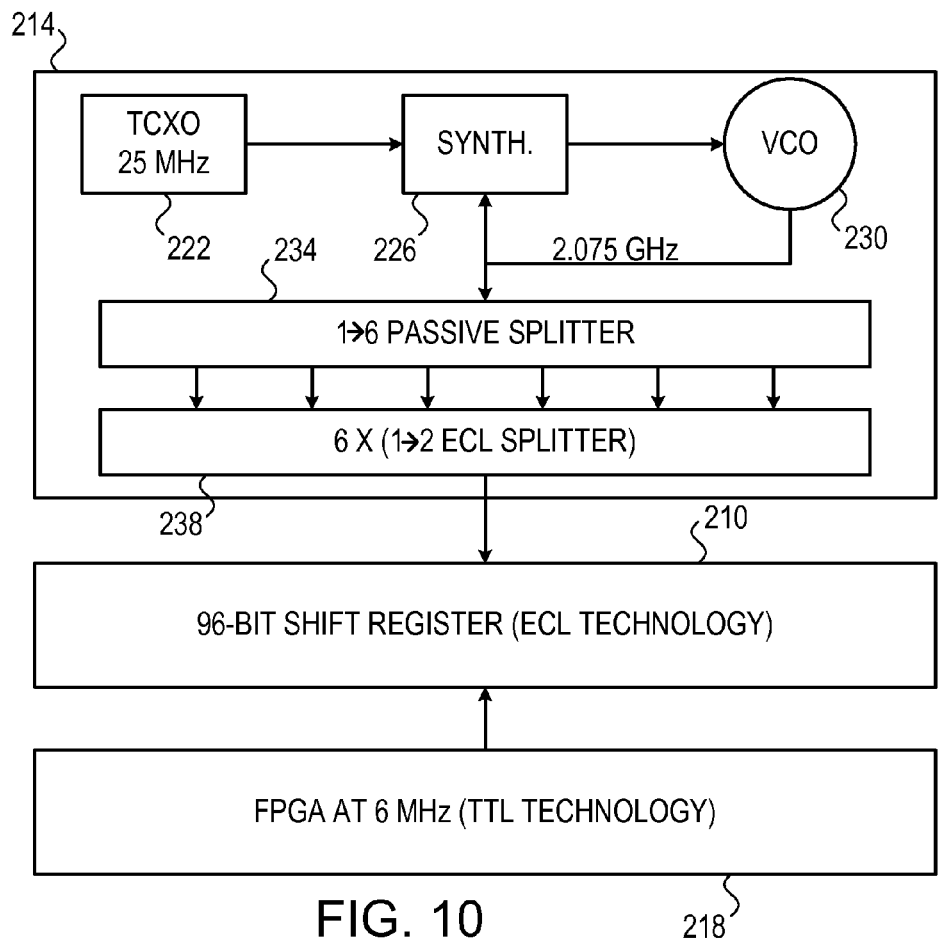
FIGS. 10 and 11 are block diagrams that schematically illustrate circuits for generating wideband, periodic waveforms, in accordance with an embodiment of the present invention.

FIG. 10 is a block diagram that schematically illustrates a circuit for generating waveforms $p_i(t)$, in accordance with an embodiment of the present invention. The circuit of FIG. 10 comprises a 96-bit shift register 210, fabricated using Emitter-Coupled Logic (ECL) technology. In the present example, the 96-bit shift register is implemented using twelve 8-bit shift register devices that are connected in cascade. Alternatively, any other suitable shift register configuration can be used.

A clock unit 214 drives shift register 210 with a clock signal at a rate of $f_{NYQ}$, in the present example 2.075 GHz. Clock unit 214 comprises a Temperature-Compensated Crystal Oscillator (TCXO) 222, which produces a 25 MHz reference clock signal. A synthesized frequency source (e.g., PLL) 226 that drives a Voltage-Controlled Oscillator (VCO) 230 is locked to this reference clock signal.

A passive splitter 234 splits the 2.075 GHz clock signal produced by VCO 230 into six identical single-ended signals. A conversion unit 238 converts each of the six single-ended signals into a respective balanced (differential) signal. Unit 238 may comprise, for example, lumped baluns. In an embodiment, each balanced clock signal is chopped or otherwise shaped into an ECL-compliant signal, e.g., using voltage barrier diodes. Finally, six ECL splitters split the six balanced clock signals into twelve ECL-compliant clock signals. Each such signal is used for clocking one of the twelve 8-bit shift register devices described above.

The initial 96-bit content (pattern) of shift register 210 is loaded by loading logic 218, in the present example comprising a Transistor-Transistor Logic (TTL) Field-Programmable Gate Array (FPGA) or Complex Programmable Logic Device (CPLD). Logic 218 typically operates at a relatively low clock rate, e.g., 6 MHz, in order to reduce power consumption.

In some embodiments, shift register 210 is used for generating all m waveforms $p_i(t)$, i=1 . . . m. Each waveform is obtained from a different shift register stage. In other words, the different waveforms $p_i(t)$ comprise cyclically-shifted replicas of one another.

Figure 11:
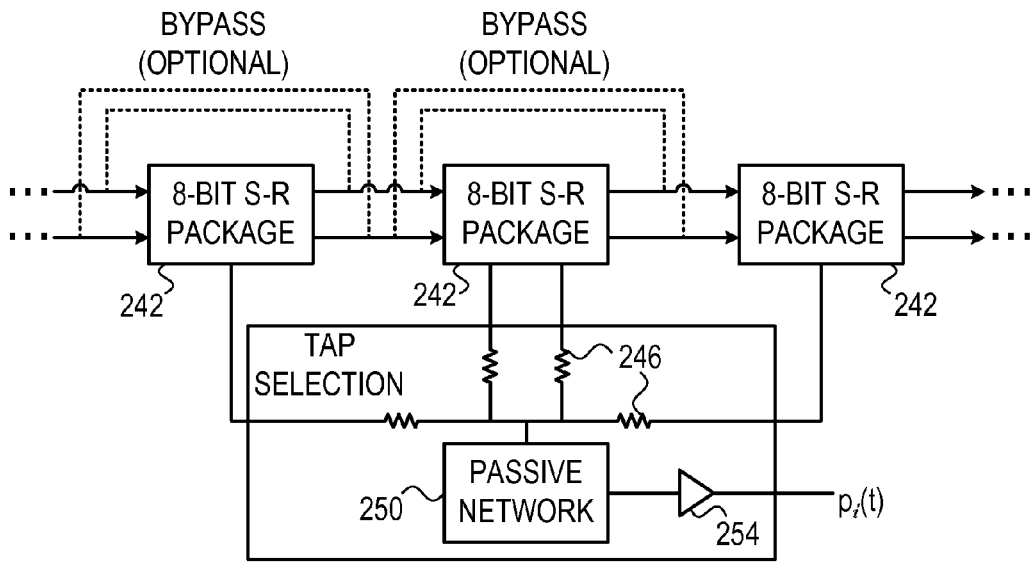

FIG. 11 is a block diagram that schematically illustrates a circuit for generating waveforms $p_i(t)$, in accordance with an embodiment of the present invention. In the present example, m=4. Each of the four waveforms $p_i(t)$ is obtained from the taps of three successive 8-bit shift register devices in the cascade. Thus, the different waveforms are shifted by at least twenty-four bits with respect to one another. FIG. 11 shows one such subset of three 8-bit shift register devices 242, and the associated circuitry that generates one of the $p_i(t)$ waveforms.

The $p_i(t)$ waveform produced by the circuit of FIG. 11 is generated by combining several taps (several outputs of shift register stages), selected from the twenty-four taps of the three shift register devices. Selection resistors 246 can be connected and/or disconnected so as to select the desired taps. The selected taps are combined, and then filtered by a passive network 250. The output of network 250 is amplified by an amplifier 254, whose output is provided to the respective mixer 34.

In alternative embodiments, the periodic waveforms $p_i(t)$ can be generated using a Linear Feedback Shift Register (LFSR). In a typical LFSR configuration some selected shift register taps are XOR'ed together, and the XOR result is fed back to the shift register input. Any tap, or combination of taps, of the LFSR can be used for generating a periodic waveform $p_i(t)$.

The different system elements shown in FIGS. 2, 3, 5, 6, 8 and 9-12 can be implemented using hardware. Digital elements can be implemented, for example, in one or more off-the-shelf devices, Application-Specific Integrated Circuits (ASICs) or FPGAs. Analog elements can be implemented, for example, using discrete components and/or one or more analog ICs. Some system elements may be implemented, additionally or alternatively, using software running on a suitable processor, e.g., a DSP device. Some system elements may be implemented using a combination of hardware and software elements.

The processors described in this patent application, e.g., controller 112, DSP 116 and controller 280, may comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

In one example embodiment, the techniques described herein can be implemented at chip level. For example, a single semiconductor device may comprise an analog front end, multiple processing channels, and reconstruction circuitry. Such a device may accept an analog multi-band input signal, perform sampling and reconstruction using the techniques disclosed herein, and output the multiple narrowband components of this signal without prior knowledge of their spectral locations. Additionally or alternatively, the device may output the data conveyed by the signal components and/or their carrier locations and/or band edges.

Example Applications

In some embodiments, the sampling and reconstruction techniques described herein are embodied in a receiver for receiving multi-band signals.

Figure 12:
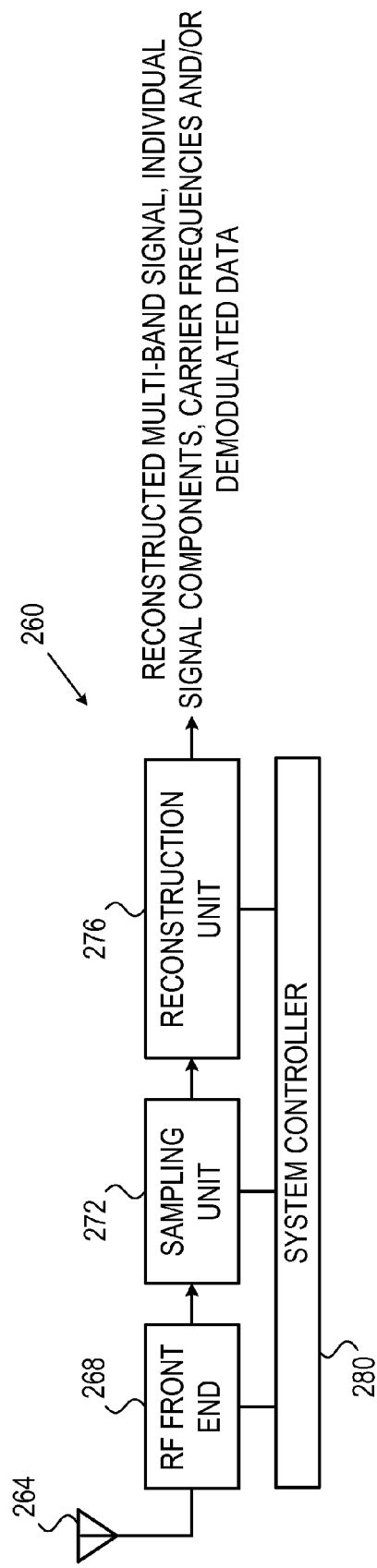
FIG. 12 is a block diagram that schematically illustrates a receiver that applies sampling and reconstruction of sparse multi-bands, in accordance with an embodiment of the present invention.

FIG. 12 is a block diagram that schematically illustrates a receiver 260 that applies sampling and reconstruction of sparse multi-bands, in accordance with an embodiment of the present invention. Receiver 260 receives a multi-band signal using an antenna 264. An RF front end typically applies low-noise amplification, filtering and down-conversion to the received signal. A sampling unit 272 samples the received signal using multiple parallel processing channels, such as using the configurations of FIGS. 2 and 9-11 above. A reconstruction unit 276 reconstructs the multi-band signal, one or more of the individual signal components of the signal, one or more of the carrier frequencies and/or the data modulated onto one or more of the signal components. Reconstruction unit 276 may be implemented, for example, using the configurations shown in FIGS. 5 and 6 above. Sampling and reconstruction may be performed using the method of FIG. 4 above. Reconstruction may involve baseband processes such as the processes shown in FIGS. 7 and 8. A system controller 280 manages and controls the receiver operation.

The sampling and reconstruction methods described herein can be used in a wide variety of applications that involve reception of multi-band signals. For example, receiver 260 may comprise a receiver of a cellular base station, a satellite earth station or of any other communication system that uses multiple frequency channels. The methods described herein can be used for extracting and demodulating multiple communication channels from a certain spectral range, without prior knowledge of the channel frequencies.

For example, receiver 260 may comprise part of a "cognitive radio" system. Cognitive radio systems, as are known in the art, automatically coordinate the allocation of frequency channels by analyzing the spectrum at the receiver. The methods and systems described herein can enable a cognitive radio receiver to analyze the available spectrum with high speed, accuracy and efficiency.

The methods described herein can also be used in electronics intelligence and reconnaissance systems. In such applications, it is often necessary to receive and process a wide spectrum, which contains multiple target channels (e.g., communication channels or radar signals) whose frequencies are not known a-priori. The methods described herein can identify spectral regions containing spectral activity, and/or reconstruct the signals received in these regions. Yet another reconnaissance-related application is in eavesdropping detection systems. Similar applications can be found in spectrum analysis, spectrum management and spectrum monitoring systems, such as systems deployed by regulatory authorities and wireless communication operators. Fast spectrum analysis is also useful in scanning receivers ("frequency scanners").

The methods and systems described herein are also advantageous when the received signals are stored or recorded for later use. For example, some radio-astronomy applications receive and record multi-band signals that are characterized by (1) unknown band locations and (2) high Nyquist frequencies. In such applications, the methods and systems described herein can considerably reduce the sampling rate of the system and hence the necessary storage volume.

Another application is in systems that perform geophysical mapping by recording the acoustic echoes produced by controlled explosions. Such systems are used, for example, in the detection of oil and other minerals and natural resources. The echoes received by such systems typically have a multi-band structure in which the band locations are not known a-priori, and the signals are often recorded for later analysis. The methods and systems described herein can be used to reduce the sampling rate of the acoustic echo signals and the storage resources needed for recording them. Similar applications can also be found in active and passive seismographic applications.

Some point-to-multipoint communication systems deploy a central receiver, which communicates with multiple end-user devices whose frequency channels may change over time due to various constraints. Such a configuration is common, for example, in various command and control ($C^2$) applications. The methods and systems described herein can significantly reduce the extent and complexity of coordination between the central site and the end-user devices, by enabling the central site receiver to receive and reconstruct the multiple signals without prior knowledge of their frequencies.

Other applications of the methods and systems described herein are in the field of test equipment and instrumentation. For example, a spectrum analyzer or similar test equipment may comprise an automatic tuning mode in which the instrument automatically adjusts its settings to match the multi-band signal at its input. For example, a spectrum analyzer can automatically adjust its frequency span or bandwidth settings, and/or detect the peaks of individual signal components, using the disclosed techniques. A similar mode can be used in cable television test equipment, e.g., for quick and efficient channel acquisition and analysis. Such a mode can be used not only in test equipment but also in a receiver of a television set or in a tuner of a video recorder. In such receivers, the methods and systems described herein can be used for mapping and/or acquiring the available television channels with high speed, accuracy and efficiency.

The methods described herein can be used in applications commonly known as Fourier imaging applications, for example in the recording of medical imaging signals such as Magnetic resonance Imaging (MRI) signals. When applying the disclosed methods to MRI, the exposure time of a patient to the MRI magnetic fields can be reduced and traded with imaging resolution. In addition, the cost of the MRI imaging system can be reduced. Further alternatively, the disclosed methods can be used in the analysis of radar signals, such as Synthetic Aperture Radar (SAR) signals.

Another application is in the field of speech processing. Speech signals sometimes have a multi-band structure over certain periods of time. Within each such time interval, the speech signal can be sampled and compressed using the methods and systems described herein, so as to directly produce a compressed version of the signal without prior knowledge of its spectral content. Applying the methods described herein to a speech signal enables sampling the signal with a low sampling rate, and thus compressing the signal to a small file size, without compromising reconstruction accuracy.

In some embodiments, the methods and systems described herein can be used for sampling and reconstructing signals whose multi-band characteristics are not in the frequency domain but in other domains, such as in time domain of in the spatial domain of an image. For example, some astronomy applications store and process images of the sky with high resolution. The received image in these applications is typically mostly dark, with only few spatial regions (bands) that are of interest. The spatial locations of the bands are not known a-priori. The methods and systems described herein, when applied to such received image signals, can be used to reduce the storage volume required to store the images, as well as for trading off between image size and image quality. Further alternatively, the methods and systems described herein can be used in any other suitable application involving reception and processing of multi-band signals.

As yet another example, the methods and systems described herein can be used in high-speed switchboards and other communication equipment that processes multiple channels, multiplexed in time or in frequency. A collection of such channels can also be regarded as a sparse multi-band signal, since many channels may be unoccupied at any given time. The channel occupancy often varies over time as a function of call progress statistics. Communication equipment (e.g., switchboard) that is designed using the disclosed techniques can sample the multiple channels according to the actual channel occupancy rather than according to the worst case assumption that all channels are occupied.

Although the embodiments described herein refer mainly to sparse signals, the disclosed techniques are also applicable to signals that occupy larger portions of the spectrum. In application that process non-sparse signals, the disclosed techniques enable sampling the signal at an overall sampling rate that is on the order of the Nyquist rate, but with a system whose internal clock rates are considerably lower.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for signal processing, comprising:
distributing an analog input signal to a plurality of processing channels;
in each processing channel, mixing the input signal with a respective periodic waveform comprising multiple spectral lines, so as to produce a respective baseband signal in which multiple spectral slices of the input signal are superimposed on one another; and
digitizing the baseband signal produced in each of the processing channels, to produce a set of digital sample sequences that represent the input signal.

2. The method according to claim 1, and comprising filtering the baseband signal in each processing channel before digitizing the signal.

3. The method according to claim 2, wherein filtering the baseband signal comprises filtering the signal using a Low-Pass Filter (LPF) having a bandwidth of a single spectral slice, and wherein digitizing the baseband signal comprises sampling the signal at a sampling rate that is equivalent to the bandwidth.

4. The method according to claim 2, wherein filtering the baseband signal comprises filtering the signal using a Low-Pass Filter (LPF) having a bandwidth that is larger than a single spectral slice, and wherein digitizing the baseband signal comprises sampling the signal at a sampling rate that is equivalent to the bandwidth.

5. The method according to claim 1, and comprising receiving respective digital sample sequences from the processing channels, and reconstructing one or more features of the input signal by processing the digital sample sequences.

6. The method according to claim 5, wherein reconstructing the features comprises generating an analog estimate of the input signal.

7. The method according to claim 5, wherein the input signal includes one or more signal components in respective spectral bands, and wherein reconstructing the features comprises generating an analog estimate of at least one of the signal components.

8. The method according to claim 5, wherein the input signal includes one or more signal components in respective spectral bands, and wherein reconstructing the features comprises identifying respective band edges of the spectral bands.

9. The method according to claim 5, wherein the input signal includes one or more signal components in respective spectral bands, and wherein reconstructing the features comprises identifying respective carrier frequencies of the spectral bands.

10. The method according to claim 5, wherein the input signal includes one or more signal components that carry data in respective spectral bands, and wherein reconstructing the features comprises demodulating at least one of the signal components so as to reconstruct the data.

11. The method according to claim 5, wherein processing the digital sample sequences comprises identifying a subset of the spectral slices containing signal energy, and reconstructing the features responsively to the identified subset.

12. The method according to claim 11, wherein identifying the subset comprises:
constructing an algebraic basis represented by a V matrix for the digital sample sequences;
finding a U matrix that is a sparsest solution of V=CU, wherein C comprises a matrix of Fourier series coefficients of the periodic waveforms; and
identifying the subset responsively to respective indices of non-zero elements of the U matrix.

13. The method according to claim 12, wherein constructing the algebraic basis comprises integrating a vector of the digital sample sequences multiplied by a transpose of the vector, to produce a Q matrix representing the basis, and finding the U matrix for V=Q.

14. The method according to claim 12, wherein constructing the algebraic basis comprises integrating a vector of the digital sample sequences multiplied by a transpose of the vector, to produce a Q matrix representing the basis, and decomposing the Q matrix so as to represent the Q matrix as a complex conjugate of the V matrix multiplied by the V matrix.

15. The method according to claim 12, wherein finding the U matrix comprises solving V=CU using a Multiple-Measurement Vector (MMV) process.

16. The method according to claim 5, wherein mixing the input signal, digitizing the baseband signal and reconstructing the features are performed in a single semiconductor device.

17. The method according to claim 5, wherein the input signal includes one or more signal components in respective spectral bands, and wherein mixing the input signal, digitizing the baseband signal and reconstructing the features are performed irrespective of frequencies of the respective spectral bands.

18. The method according to claim 1, wherein the input signal includes one or more signal components in respective spectral bands whose frequencies are known a-priori.

19. The method according to claim 1, and comprising pre-equalizing a frequency response of the input signal in at least one of the processing channels before mixing the input signal with the respective periodic waveform.

20. The method according to claim 1, and comprising adjusting a power level of the periodic waveform in at least one of the processing channels before mixing the input signal with the periodic waveform.

21. The method according to claim 1, and comprising generating the respective periodic waveform for at least one of the processing channels using a digital shift register.

22. The method according to claim 21, wherein generating the periodic waveform comprises generating multiple different periodic waveforms, for mixing with the input signal in the respective processing channels, from respective different taps of the shift register.

23. The method according to claim 21, wherein generating the periodic waveform comprises cascading two or more shift register devices to form the shift register, and generating the periodic waveform using the cascaded shift register devices.

24. The method according to claim 1, wherein the input signal comprises a communication signal carrying multiple communication channels.

25. The method according to claim 24, wherein the communication channels are part of a cognitive radio system.

26. The method according to claim 1, wherein the input signal comprises one of a radar signal and a medical imaging signal.

27. The method according to claim 1, wherein the input signal comprises one of an acoustic echo signal, a speech signal and an image signal.

28. The method according to claim 1, wherein distributing and mixing the input signal and digitizing the baseband signal are performed in a spectrum analyzer that analyzes the input signal.

29. The method according to claim 1, wherein distributing and mixing the input signal and digitizing the baseband signal are performed in a communication switchboard that processes the input signal.

30. Apparatus for signal processing, comprising:
a plurality of processing channels for processing an analog input signal, each of which processing channels comprises:
a mixer, which is configured to mix the input signal with a respective periodic waveform comprising multiple spectral lines, so as to produce a respective baseband signal in which multiple spectral slices of the input signal are superimposed on one another; and
an Analog-to-Digital Converter (ADC), which is configured to digitize the baseband signal produced in each of the processing channels, to produce a respective digital sample sequence.

31. The apparatus according to claim 30, wherein each of the processing channels comprises a filter, which is configured to filter the baseband signal before digitizing the signal by the respective ADC.

32. The apparatus according to claim 31, wherein the filter comprises a Low-Pass Filter (LPF) having a bandwidth of a single spectral slice, and wherein the ADC is configured to digitize the baseband signal at a sampling rate that is equivalent to the bandwidth.

33. The apparatus according to claim 31, wherein the filter comprises a Low-Pass Filter (LPF) having a bandwidth that is larger than a single spectral slice, and wherein the ADC is configured to digitize the baseband signal at a sampling rate that is equivalent to the bandwidth.

34. The apparatus according to claim 30, and comprising a reconstruction unit, which is configured to receive respective digital sample sequences from the processing channels and to reconstruct one or more features of the input signal by processing the digital sample sequences.

35. The apparatus according to claim 34, wherein the reconstruction unit is configured to generate an analog estimate of the input signal.

36. The apparatus according to claim 34, wherein the input signal includes one or more signal components in respective spectral bands, and wherein the reconstruction unit is configured to generate an analog estimate of at least one of the signal components.

37. The apparatus according to claim 34, wherein the input signal includes one or more signal components in respective spectral bands, and wherein the reconstruction unit is configured to identify respective band edges of the spectral bands.

38. The apparatus according to claim 34, wherein the input signal includes one or more signal components in respective spectral bands, and wherein the reconstruction unit is configured to identify respective carrier frequencies of the spectral bands.

39. The apparatus according to claim 34, wherein the input signal includes one or more signal components that carry data in respective spectral bands, and wherein the reconstruction unit is configured to demodulate at least one of the signal components so as to reconstruct the data.

40. The apparatus according to claim 34, wherein the reconstruction unit is configured to identify a subset of the spectral slices containing signal energy, and to reconstruct the features based on the identified subset.

41. The apparatus according to claim 40, wherein the reconstruction unit is configured to identify the subset by:
constructing an algebraic basis represented by a V matrix for the digital sample sequences;
finding a U matrix that is a sparsest solution of V=CU, wherein C comprises a matrix of Fourier series coefficients of the periodic waveforms; and
identifying the subset responsively to respective indices of non-zero elements of the U matrix.

42. The apparatus according to claim 41, wherein the reconstruction unit is configured to construct the algebraic basis by integrating a vector of the digital sample sequences multiplied by a transpose of the vector, to produce a Q matrix representing the basis, and finding the U matrix for V=Q.

43. The apparatus according to claim 41, wherein the reconstruction unit is configured to construct the algebraic basis by integrating a vector of the digital sample sequences multiplied by a transpose of the vector, to produce a Q matrix representing the basis, and decomposing the Q matrix so as to represent the Q matrix as a complex conjugate of the V matrix multiplied by the V matrix.

44. The apparatus according to claim 41, wherein the reconstruction unit is configured to find the U matrix by solving V=CU using a Multiple-Measurement Vector (MMV) process.

45. The apparatus according to claim 34, wherein the processing channels and the reconstruction unit are comprised in a single semiconductor device.

46. The apparatus according to claim 34, wherein the input signal includes one or more signal components in respective spectral bands, and wherein the processing channels and the reconstruction unit are configured to mix the input signal, digitize the baseband signal and reconstruct the features irrespective of frequencies of the respective spectral bands.

47. The apparatus according to claim 30, wherein the input signal includes one or more signal components in respective spectral bands whose frequencies are known a-priori.

48. The apparatus according to claim 30, and comprising an equalizer, which is configured to pre-equalize a frequency response of the input signal in at least one of the processing channels before mixing the input signal with the respective periodic waveform.

49. The apparatus according to claim 30, and comprising a power control circuit, which is configured to adjust a power level of the periodic waveform in at least one of the processing channels before mixing the input signal with the periodic waveform.

50. The apparatus according to claim 30, and comprising a digital shift register, which is configured to generate the respective periodic waveform for at least one of the processing channels using.

51. The apparatus according to claim 50, wherein the shift register is configured to output multiple different periodic waveforms, for mixing with the input signal in the respective processing channels, from respective different taps of the shift register.

52. The apparatus according to claim 50, wherein the shift register comprises two or more shift register devices connected in cascade.

53. The apparatus according to claim 30, wherein the input signal comprises a communication signal carrying multiple communication channels.

54. The apparatus according to claim 53, wherein the communication channels are part of a cognitive radio system.

55. The apparatus according to claim 30, wherein the input signal comprises one of a radar signal and a medical imaging signal.

56. The apparatus according to claim 30, wherein the input signal comprises one of an acoustic echo signal, a speech signal and an image signal.

57. The apparatus according to claim 30, wherein the processing channels are comprised in a spectrum analyzer that analyzes the input signal.

58. The apparatus according to claim 30, wherein the processing channels are comprised in a communication switchboard that processes the input signal.

59. A receiver, comprising:
a front end, which is configured to receive an analog input signal;
a plurality of processing channels, each of which processing channels comprises:
a mixer, which is configured to mix the input signal with a respective periodic waveform comprising multiple spectral lines, so as to produce a respective baseband signal in which multiple spectral slices of the input signal are superimposed on one another; and
an Analog-to-Digital Converter (ADC), which is configured to digitize the baseband signal produced in each of the processing channels, to produce a respective digital sample sequence; and
a reconstruction unit, which is configured to receive respective digital sample sequences from the processing channels and to reconstruct one or more features of the input signal by processing the digital sample sequences.

* * * * *